US012664096B2

(12) United States Patent
Patel

(10) Patent No.: US 12,664,096 B2
(45) Date of Patent: Jun. 23, 2026

(54) COHERENT HIERARCHICAL CACHE LINE TRACKING

(71) Applicant: Akeana, Inc., San Jose, CA (US)

(72) Inventor: Sanjay Patel, San Ramon, CA (US)

(73) Assignee: Akeana, Inc., Santa Clara, CA (US)

( * ) Notice: Subject to any disclaimer, the term of this patent is extended or adjusted under 35 U.S.C. 154(b) by 0 days.

(21) Appl. No.: 18/734,006

(22) Filed: Jun. 5, 2024

(65) Prior Publication Data

US 2024/0419595 A1      Dec. 19, 2024

Related U.S. Application Data

(60) Provisional application No. 63/640,921, filed on May 1, 2024, provisional application No. 63/641,045, filed
(Continued)

(51) Int. Cl.
*G06F 12/08* (2016.01)
*G06F 12/0817* (2016.01)

(52) U.S. Cl.
CPC .... *G06F 12/0828* (2013.01); *G06F 2212/621* (2013.01)

(58) Field of Classification Search
CPC ................. G06F 12/08; G06F 12/0828; G06F 2212/621; G06F 12/0817
See application file for complete search history.

(56) References Cited

U.S. PATENT DOCUMENTS 6,934,809 B2     8/2005  Tremblay et al.
7,506,105 B2     3/2009  Al-Sukhni et al.
(Continued)

FOREIGN PATENT DOCUMENTS

WO       WO-2016100978 A1 *  6/2016 ......... G06F 15/7867
WO       WO-2019193455 A1 * 10/2019 ......... G06F 12/0833
WO            2022117687 A1     6/2022

OTHER PUBLICATIONS

H. Arora, R. Mukherjee, A. Bej and H. Adak, "Directory based cache coherence modeller in multiprocessors: Medium insight," 2014 International Conference on Advances in Computing, Communications and Informatics (ICACCI), Delhi, India, 2014, pp. 2611-2617.*
(Continued)

*Primary Examiner* — Pierre Michel Bataille
(74) *Attorney, Agent, or Firm* — Adams Intellex, PLC

(57) ABSTRACT

Techniques for coherency management based on coherent hierarchical cache line tracking are disclosed. A plurality of processor cores is accessed. Each processor of the plurality of processor cores includes a local cache. A hierarchical cache is coupled to the plurality of processor cores. The hierarchical cache is shared among the plurality of processor cores. Coherency between the plurality of processor cores and the hierarchical cache is managed by a compute coherency block (CCB). A cache line directory is provided for the CCB. The cache line directory includes a core list field and a cache line present field. A cache line operation is detected. The cache line operation is detected by the CCB. The cache line operation is represented by an entry in the cache line directory. The cache line operation is performed, based on corresponding values of the core list field and the line present field.

25 Claims, 7 Drawing Sheets

Related U.S. Application Data on May 1, 2024, provisional application No. 63/570,281, filed on Mar. 27, 2024, provisional application No. 63/564,529, filed on Mar. 13, 2024, provisional application No. 63/563,492, filed on Mar. 11, 2024, provisional application No. 63/563,102, filed on Mar. 8, 2024, provisional application No. 63/556,951, filed on Feb. 23, 2024, provisional application No. 63/556,944, filed on Feb. 23, 2024, provisional application No. 63/605,620, filed on Dec. 4, 2023, provisional application No. 63/602,514, filed on Nov. 24, 2023, provisional application No. 63/547,574, filed on Nov. 7, 2023, provisional application No. 63/547,404, filed on Nov. 6, 2023, provisional application No. 63/546,769, filed on Nov. 1, 2023, provisional application No. 63/545,961, filed on Oct. 27, 2023, provisional application No. 63/542,797, filed on Oct. 6, 2023, provisional application No. 63/526,009, filed on Jul. 11, 2023, provisional application No. 63/521,365, filed on Jun. 16, 2023, provisional application No. 63/471,283, filed on Jun. 6, 2023, provisional application No. 63/653,402, filed on May 30, 2024.

(56) References Cited

U.S. PATENT DOCUMENTS

| | | | |
|---|---|---|---|
| 10,013,356 | B2 | 7/2018 | Chou |
| 10,671,394 | B2 | 6/2020 | Britto et al. |
| 10,929,948 | B2 | 2/2021 | Benthin et al. |
| 11,288,405 | B2 | 3/2022 | Belgarric et al. |
| 11,403,099 | B2 | 8/2022 | Cerny et al. |
| 11,403,225 | B2 | 8/2022 | Zheng et al. |
| 11,429,529 | B2 | 8/2022 | Hornung et al. |
| 11,442,863 | B2 | 9/2022 | Shulyak et al. |
| 11,474,130 | B2 | 10/2022 | Lentz et al. |
| 11,486,911 | B2 | 11/2022 | Tuncer et al. |
| 2014/0006716 | A1* | 1/2014 | Steeley, Jr. ........... G06F 15/167 711/130 |
| 2019/0188137 | A1* | 6/2019 | Kalyanasundharam .................... G06F 12/128 |
| 2019/0303295 | A1* | 10/2019 | Steinmacher-Burow ................... G06F 12/0833 |
| 2022/0004639 | A1 | 1/2022 | Yardi et al. |
| 2022/0029780 | A1 | 1/2022 | Dafali |
| 2022/0197657 | A1 | 6/2022 | Soundararajan et al. |

OTHER PUBLICATIONS

J. H. Kelm, M. R. Johnson, S. S. Lumetta and S. J. Patel, "WayPoint: Scaling coherence to 1000-core architectures, " 2010 19th International Conference on Parallel Architectures and Compilation Techniques (PACT), Vienna, Austria, 2010, pp. 99-109.*

C. Li, H. Wang, Y. Xue, X. Zhang and D. Wang, "Fast Hierarchical Cache Directory: A Scalable Cache Organization for Large-Scale CMP," 2010 IEEE Fifth International Conference on Networking, Architecture, and Storage, Macau, China, 2010, pp. 367-376.*

P. Conway, N. Kalyanasundharam, G. Donley, K. Lepak and B. Hughes, "Cache Hierarchy and Memory Subsystem of the AMD Opteron Processor," in IEEE Micro, vol. 30, No. 2, pp. 16-29, Mar.-Apr. 2010.*

* cited by examiner

300

CORE 3
340

$3
342

CORE 2
330

$2
332

CORE 1
320

$1
322

CORE 0
310

$0
312

HIERARCHICAL CACHE
350

COHERENT
CACHE
STRUCTURE
352

DIRECTORY
362

TAG RAM
366

SNOOP
QUEUE
364

DATA RAM
368

CACHE LINE
DIRECTORY
360

MEMORY
370

COHERENT HIERARCHICAL CACHE LINE TRACKING

RELATED APPLICATIONS

This application claims the benefit of U.S. provisional patent applications "Coherent Hierarchical Cache Line Tracking" Ser. No. 63/471,283, filed Jun. 6, 2023, "Direct Cache Transfer With Shared Cache Lines" Ser. No. 63/521,365, filed Jun. 16, 2023, "Polarity-Based Data Prefetcher With Underlying Stride Detection" Ser. No. 63/526,009, filed Jul. 11, 2023, "Mixed-Source Dependency Control" Ser. No. 63/542,797, filed Oct. 6, 2023, "Vector Scatter And Gather With Single Memory Access" Ser. No. 63/545,961, filed Oct. 27, 2023, "Pipeline Optimization With Variable Latency Execution" Ser. No. 63/546,769, filed Nov. 1, 2023, "Cache Evict Duplication Management" Ser. No. 63/547,404, filed Nov. 6, 2023, "Multi-Cast Snoop Vectors Within A Mesh Topology" Ser. No. 63/547,574, filed Nov. 7, 2023, "Optimized Snoop Multi-Cast With Mesh Regions" Ser. No. 63/602,514, filed Nov. 24, 2023, "Cache Snoop Replay Management" Ser. No. 63/605,620, filed Dec. 4, 2023, "Processing Cache Evictions In A Directory Snoop Filter With ECAM" Ser. No. 63/556,944, filed Feb. 23, 2024, "System Time Clock Synchronization On An SOC With LSB Sampling" Ser. No. 63/556,951, filed Feb. 23, 2024, "Malicious Code Detection Based On Code Profiles Generated By External Agents" Ser. No. 63/563,102, filed Mar. 8, 2024, "Processor Error Detection With Assertion Registers" Ser. No. 63/563,492, filed Mar. 11, 2024, "Starvation Avoidance In An Out-Of-Order Processor" Ser. No. 63/564,529, filed Mar. 13, 2024, "Vector Operation Sequencing For Exception Handling" Ser. No. 63/570,281, filed Mar. 27, 2024, "Vector Length Determination For Fault-Only-First Loads With Out-Of-Order Micro-Operations" Ser. No. 63/640,921, filed May 1, 2024, "Circular Queue Management With Nondestructive Speculative Reads" Ser. No. 63/641,045, filed May 1, 2024, and "Direct Data Transfer With Cache Line Owner Assignment" Ser. No. 63/653,402, filed May 30, 2024.

Each of the foregoing applications is hereby incorporated by reference in its entirety.

FIELD OF ART

This application relates generally to coherency management and more particularly to coherent hierarchical cache line tracking.

BACKGROUND

Electronic devices have become commonplace and essential to modern society. A computational revolution in science, engineering, and mathematics ensued from the invention of the transistor in 1947. Transistors replaced vacuum tubes in analog computers and in logic circuits to yield smaller, cheaper, more power efficient, and significantly more reliable computing devices. These discrete devices produced voltages or currents that could represent logic "one" and logic "zero", but the systems based on these devices were large and of limited computational utility. With the invention of the monolithic integrated circuit in 1959, multiple transistors and other components were integrated onto or into a single substrate. Integration drastically changed electronic logic and digital circuit design, enabling increasing numbers of transistors or "devices" to be produced on a single substrate. As integrated circuit fabrication techniques improved, the functions that could be performed by the integrated circuits became increasingly complex. In 1971, the first commercially available "microprocessor" was released. This microprocessor could be programmed to enable a wide variety of applications including computation and control. Integration design and fabrication techniques have rapidly evolved, enabling the production of processors with previously unobtainable power and flexibility. As processor manufacturing prices have decreased, simple, inexpensive processors have been cost-effectively designed into common, everyday products including kitchen appliances, personal care items, vehicles, and much, much more.

Devices, equipment, and tools widely incorporate modern integrated circuits. These integrated circuits can include several different functions in a single chip and can enable a rich and diverse feature set. Early circuit designs included chips that accomplished specific functions. These chips were installed on a circuit board. The multichip designs are now replaced with multiple "cores" integrated into a single chip. These cores can be purchased or licensed for a design. The cores can include processors, memory, GPS units, radios, and cameras, among many other functions. The chips produced with these or other cores can be commonly found in electronic devices such as smartphones, tablets, televisions, laptop computers and desktop computers, gaming consoles, and more. The chips enable and greatly enhance device features and utility. Electronic toys and games have benefited from the inclusion of advanced integrated circuits. The chips are programmed to enhance engagement of players with widely different experience levels. Further, the chips can produce highly realistic audio and graphics, enabling players to engage mysterious and exotic digital worlds and situations. Integrated circuits are also found in vehicles of all types. The chips enable new and useful features to be added to the vehicles. The chips improve fuel economy and vehicle operating efficiency, vehicle safety, user comfort, and user entertainment.

SUMMARY

People worldwide routinely interact with various electronic devices. These electronic devices can be large or small, stationary or portable, and powerful or simple, among other features. The electronic devices include personal electronic devices such as computers, handheld electronic devices, and smartwatches. The electronic devices also include household devices including kitchen and cleaning appliances; personal, private, and mass transportation vehicles; and medical equipment; among many other familiar devices. Common to each of these devices is that their construction includes one type or often many types of integrated circuits or chips. The chips enable many desirable and useful features by performing processing and control tasks. The electronic processors enable the devices to execute a wide number of applications. The applications include data processing, entertainment, messaging, patient monitoring, telephony, vehicle access, configuration and operation control, etc. Other electronic elements are coupled to the processors, which enable the processors to execute the features and applications. The further elements typically include one or more of memories, radios, networking channels, peripherals, touch screens, and so on. Portions or blocks of the contents of a shared, or common, memory can be moved to local cache memory to boost processor performance. The local cache memory is smaller, faster, and located closer to the processor than the shared memory. Using local cache memory also takes advantage of "locality"

typical to application code executed by the processors. Coupling the cache memory to processors drastically reduces memory access times. The cache memory can be accessed by one, some, or all of a plurality of processors without having to access the slower common memory, thereby reducing access time and increasing processing speed. However, the use of smaller cache memory means that new cache lines must be brought into the cache memory to replace no-longer-needed cache lines (called a cache miss, which requires a cache line fill), and that existing cache lines in the cache memory that are no longer synchronized (coherent) must be evicted and managed across all caches and the common memory.

Coherency management is enabled by coherent hierarchical cache line tracking. A plurality of processor cores is accessed, wherein each processor of the plurality of processor cores includes a local cache. A hierarchical cache is coupled to the plurality of processor cores, wherein the hierarchical cache is shared among the plurality of processor cores, wherein coherency between the plurality of processor cores and the hierarchical cache is managed by a compute coherency block (CCB). A cache line directory is provided for the CCB, wherein the cache line directory includes a core list field and a cache line present field. A cache line operation is detected, wherein the cache line operation is detected by the CCB, and wherein the cache line operation is represented by an entry in the cache line directory. The cache line operation is performed, based on corresponding values of the core list field and the line present field.

A processor-implemented method for coherency management is disclosed comprising: accessing a plurality of processor cores, wherein each processor of the plurality of processor cores includes a local cache; coupling a hierarchical cache to the plurality of processor cores, wherein the hierarchical cache is shared among the plurality of processor cores, wherein coherency between the plurality of processor cores and the hierarchical cache is managed by a compute coherency block (CCB); providing a cache line directory for the CCB, wherein the cache line directory includes a core list field and a cache line present field; detecting a cache line operation, wherein the cache line operation is detected by the CCB, and wherein the cache line operation is represented by an entry in the cache line directory; and performing the cache line operation, based on corresponding values of the core list field and the line present field. In embodiments, the core list field contains N bits, where N is the number of cores managed by the CCB. In embodiments, the cache line present field contains M bits, where M is the number of cache types in each of the processor cores. In embodiments, the cache line present field indicates that a cache line present in the hierarchical cache is also present in at least one processor core cache. Some embodiments comprise inferring cache line ownership, based on corresponding values of the core list field and the line present field.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
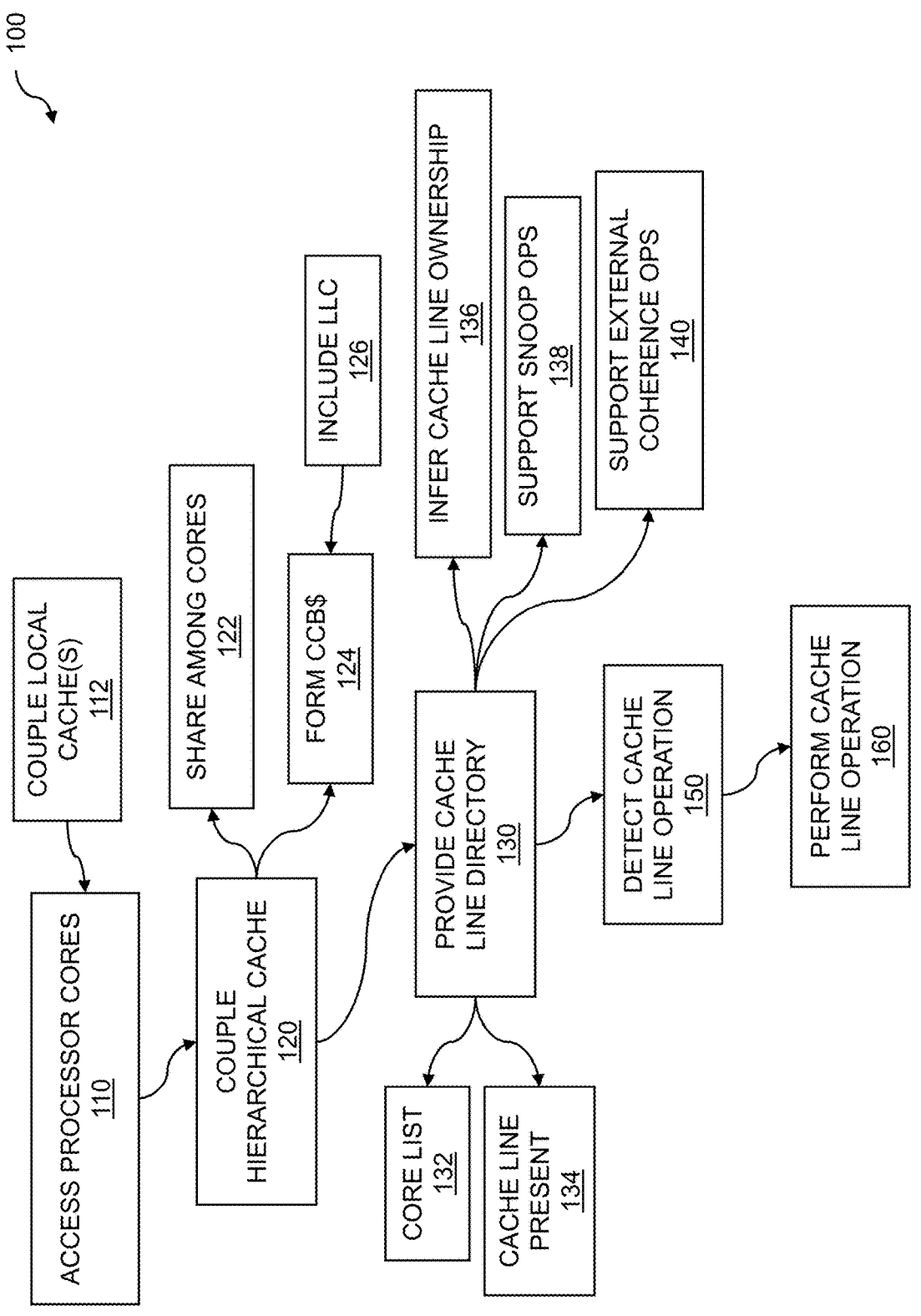
FIG. 1 is a flow diagram for coherent hierarchical cache line tracking.

Techniques for coherency management using coherent hierarchal cache line tracking are described. The coherency management can maintain cache line validity and cache coherency among one or more processor cores, local caches coupled to each processor core, common memories, shared caches, and so on. The processor cores can be used to accomplish a variety of data processing tasks. A processor cores can include a standalone processor, a processor chip, a multi-core processor, and the like. The processing of data can be significantly enhanced by using two or more processor cores (e.g., parallel processors) to process the data. The processor cores can be performing substantially similar operations, where the processor cores can process different portions or blocks of data in parallel. The processor cores can be performing substantially different operations, where the processor cores can process different blocks of data or may try to perform different operations on the same data. Whether the operations performed by the processor cores are substantially similar or not, managing how processor cores access data is critical to successfully processing the data. Since the processor cores can operate on data in shared storage such as a common memory structure, and on copies of the common memory data loaded into local caches, data coherency must be maintained between the common storage and the local caches. Thus, when changes are made to a copy of the data, the changes must be propagated to all other copies of the data and to the common memory.

The execution rate of data processing operations such as those associated with large datasets, large numbers of similar processing jobs, and so on can be increased by using one or more local or "cache" memories. A cache memory can be used to store a local copy of the data to be processed, thereby making the data easily accessible. A cache memory, which by design is typically smaller and has much lower access times than a shared, common memory, can be coupled between the common memory and the processor cores. Further, each processor core can include a local cache, thereby adding additional storage in which copies of the data can be stored. As the processor cores process data, they search first within the cache memory for an address containing the data. If the address is not present within the cache, then a "cache miss" occurs, and the data requested by the processor cores can be obtained from an address within one or more higher levels of cache. If a cache miss occurs within the higher-level caches, then the requested data can be obtained from the address in the common memory. Data access by one or more processors using the cache memory is highly preferable to accessing common memory because of reduced latency associated with accessing the local cache memory as opposed to the remote common memory. The advantage of accessing data within the cache is further enhanced by the "locality of reference". The locality of reference indicates that code that is being executed tends to access a substantially similar set of memory addresses. The locality of reference can apply whether the memory addresses are located in the common memory, a higher-level cache, or the local cache memory. By loading the contents of a set of common memory addresses into the cache, the processor cores are, for a number of cycles, more likely to find the requested data within the cache. As a result, the processor cores can obtain the requested data faster from the cache than if the requested data were obtained from the common memory. However, due to the smaller size of the cache with respect to the common memory, a cache miss can occur when the requested memory address is not present within the cache. One cache replacement technique that can be implemented loads a new block of data from the common memory into the local cache memory, where the new block contains one or more cache lines, and where a cache line can include the requested address. Thus, after the one or more cache lines are transferred to the cache, processing can again continue by accessing the faster cache rather than the slower common memory.

The processor cores can read a copy of data from a memory such as a cache memory, process the data, and then write the processed data back to the cache. As a result of the processing, the contents of the cache can be different from the contents of other caches and of the common memory. Coherency management techniques can be used to keep the state of the data in the common memory and the shared data in the one or more shared caches or local caches "in sync". A complementary problem can occur when out-of-date data remains in the cache after the contents of the common memory are updated. As before, this state discrepancy can be remedied using coherency management techniques. In embodiments, additional local caches can be coupled to processors, groupings of processors, etc. While the additional local caches can greatly increase processing speed, the additional caches further complicate coherency management. Techniques presented herein address coherency management between a shared last-level cache and local caches. The presented techniques further address cache management based on using shared cache line memory. The coherency management can be accomplished by providing a cache line directory for a compute coherency block. The cache line directory contains fields such as a core list field and a cache line present field. The fields can be used to determine the presence or absence of a given cache line in cache memory. The fields can also be used to determine ownership of a cache line, where ownership can include shared ownership or unique ownership. Snoop operations, which can be based on access operations such as read operations generated by processors, can be used to determine whether a difference exists between data in the common memory and data in the one or more caches. If differences are detected, then the cache maintenance operations can resynchronize the data between the common memory and the one or more caches. The cache maintenance operations can be based on transferring cache lines between the compute coherency block cache and the shared common memory, or between the compute coherency block cache and other compute coherency block caches. The transferring can be accomplished using a bus interface unit. The bus interface unit can provide access to the common memory. In addition to transfers from the common memory to local caches and shared caches based on cache misses, cache transfers can also occur from the local caches and the shared caches to the common memory as a result of changes performed by the processor cores to the cache contents. The updated or "dirty" cache contents can be transferred to the common memory and can be copied to other caches in order to maintain coherency.

In disclosed techniques, the coherency management issues are addressed by coherent hierarchical cache line tracking. The hierarchical cache line tracking can be applied to a compute coherency block. A compute coherency block can include a plurality of processor cores. Each processor core includes a local cache. The cache line tracking is accomplished by providing a cache line directory to the compute coherency block. The cache line directory includes fields that are used to indicate the presence of a cache line in one or more caches and to infer ownership of the cache line. The cache line directory includes a core list field and a cache line present field, where each field includes a number of bits. The core list field contains N bits, where N is the number of cores managed by the CCB. The cache line present field contains M bits, where M is the number of cache types in each of the processor cores. M is equal to two to represent an instruction cache (I$) and a data cache (D$). Ownership of a cache line in the local caches, the instruction cache, or the data cache can be inferred by examining values in the core list field and the line present field. Ownership of the cache line is inferred to be shared when more than one bit in the core list field is set, at least one bit in the core list field is set and an instruction cache bit in the cache line present field is set, and so on. The cache line is inferred to be unique when only one bit in the core list field is set and only a data cache bit is set.

A snoop operation, or snoop request, can be supported within the CCB. Snoop operations can look for cache line local caches, in a shared, hierarchical cache and in shared, common memory due to cache misses. The common memory can be coupled to the multiple CCB caches using Network-on-Chip (NoC) technology. The snoop operations can be used to determine whether data access operations being performed by more than one processor core access the same memory address in one or more caches or the shared common memory. Cache lines that are evicted from local caches can be stored in an evict queue. The snoop operations can be used to determine whether cache lines within the evict queue can be committed to storage in the common memory without overwriting data already in the common memory that is required by another processor. The snoop requests can further monitor transactions such as data reads from and data writes to the common memory. While read operations leave data contained within a cache or the common memory unchanged, a write operation to a cache or to the common memory can change data. As a result, the copy of the data within a cache can become "incoherent" or "dirty" with respect to the common memory, either due to changes to the cache contents or changes to the common memory contents. The data changes, if not monitored and corrected using coherency management techniques, result in cache coherency problems. That is, new data can overwrite old data before the old data is used, old data is read before new data can be written, etc.

FIG. 1 is a flow diagram for coherent hierarchical cache line tracking. The cache line tracking can be performed for a coherency domain. The coherency domain can include a compute coherency domain. The compute coherency domain can include one or more processor cores, a local cache coupled to each processor core, shared caches, common memory, a processor, one or more processor cores, and so on. A processor can include a multicore processor such as a RISC-V™ processor. The processor cores can comprise homogeneous processor cores or heterogeneous processor cores. The included cores can have substantially similar capabilities or substantially different capabilities. The processor cores can comprise further elements which can work in cooperation with the processor cores. The processor cores and the further elements can be coupled to a network, where the network can enable communications among the processors and the various elements. The network can include a network-on-chip (NoC). The further elements can include one or more of physical memory protection (PMP) elements, memory management (MMU) elements, level 1 (L1) caches such as instruction caches and data caches, level 2 (L2) caches, and the like. The multicore processor can further include a level 3 (L3) cache, test and debug support such as Joint Test Action Group (JTAG) elements, a platform-level interrupt controller (PLIC), an advanced core local interrupter (ACLINT), and so on. In addition to the elements just described, the multicore processor can include one or more interfaces. The interfaces can include one or more industry standard interfaces, interfaces specific to the multicore processor, and the like. In embodiments, the interfaces can include an Advanced eXtensible Interface (AXI™) such as AXI4™ an ARM™ Advanced eXtensible Interface (AXI™) Coherence Extensions (ACE™) interface, an Advanced Microcontroller Bus Architecture (AMBA™) Coherence Hub Interface (CHI™), etc. The interfaces can enable connection between the multicore processor and an interconnect. In embodiments, the interconnect can include an AXI™ interconnect. The interconnect can enable the multicore processor to access a variety of elements such as storage elements, communications elements, peripherals, memory mapped input/output elements, etc.

The flow 100 includes accessing a plurality of processor cores 110. The processor cores can include homogeneous processor cores, heterogeneous processor cores, and so on. The cores can include general purpose cores, specialty cores, custom cores, and the like. In embodiments, the cores can be associated with a multicore processor such as a RISC-V™ processor. The cores can be included in one or more integrated circuits or "chips", application-specific integrated circuits (ASICs), programmable gate arrays (PGAs), etc. The cores can be included in the form of a high-level design language (HDL) delivery. In embodiments, the plurality of processor cores can include a coherency domain. The coherency domain can be used to maintain coherency among processor cores, processor cores and one or more cache memories, processor cores and one or more common memory structures, etc. In the flow 100, each processor core of the plurality of processor cores can include a local cache 112. A The local cache can include a dedicated local cache. The dedicated local cache can include a single level cache, a multilevel cache, and so on. A dedicated local cache can be coupled to more than one processor core. In embodiments, the dedicated local cache can be included in a coherency domain (discussed below). Thus, coherency can be maintained among the plurality of processors, the dedicated local caches, and a common memory structure. In embodiments, two or more processor cores of the plurality of processor cores can generate read operations. The read operations can be used to access contents of one or more storage elements such as the local caches. The read operations can include read operations to a local cache, one or more shared caches, a common memory structure, and so on. Other operations can be generated by two or more processor cores. In embodiments, the two or more processor cores of the plurality of processor cores can generate write operations, read-modify-write operations, etc.

Embodiments can include providing a common memory structure. The common memory structure can include a single port memory, a multiport memory, and the like. The common memory can be embedded or standalone, and it can utilize various memory technologies, such as dynamic random-access memory (DRAM), static random-access memory (SRAM), phase-change memory (PCM), NAND flash memory, and so on. The common memory structure can comprise various registers, flipflops, register files, caches, and so on. The common memory structure can be used to supply data to and receive data from a cache or cache hierarchy. The cache can comprise a multi-level cache, where the levels can include level 1 (L1), level 2 (L2), level 3 (L3), and so on. Each succeeding level can be larger and slower than the prior level such that L2 can be larger and slower than L1, L3 can be larger and slower than L2, and so on. In embodiments, the caches and even the common memory structure can have data regions and instruction regions (e.g., Harvard architecture). The data regions and instruction regions can include regions that are physically separated, logically separated, etc. The common memory structure can be accessible to the plurality of processor cores through an interconnect or a network, a bus, an interface element, etc. The interface element can support standard processor interfaces including an Advanced eXtensible Interface (AXI™) such as AXI4™, an ARM™ Advanced eXtensible Interface (AXI™) Coherence Extensions (ACE™) interface, an Advanced Microcontroller Bus Architecture (AMBA™) Coherence Hub Interface (CHI™), etc. The interface elements can be coupled to the interconnect. The interconnect can include a bus, a network, and so on. The interconnect can include an AXI™ interconnect. In addition to the read operations generated by the one or more processor cores, other memory access operations such as write operations, read-modify-write operations, etc. can be performed. In embodiments, the memory accesses can be performed over a network-on-chip. The network-on-chip can enable data, instruction, control, and other information communication among the processors and the additional elements. In embodiments, the network-on-chip can be included in the coherency domain. The coherent network-on-chip can include coherency messaging (e.g., cache coherency transactions) and cache miss requests.

The flow 100 includes coupling a hierarchical cache 120 to the plurality of processor cores. The hierarchical cache can include a single level cache, a multilevel cache, and so on. The hierarchical cache can include a small, fast memory in which a cache block can be stored. A cache block can include one or more cache lines, such as 16, 32, 64 cache lines, and the like. In embodiments, a cache block can include 256 cache lines. In the flow 100, the hierarchical cache is shared 122 among the plurality of processor cores. The hierarchical cache can be colocated with the plurality of processor cores. The colocation of the hierarchical cache with the processor cores can enable fast access to the contents such as cache lines within the hierarchical cache. The hierarchical cache can be coupled to the cores, accessible to the cores via a bus or a network, and so on. The hierarchical cache can comprise a shared level 2 (L2) cache among the processor cores and their associated level 1 (L1) caches. The hierarchical cache can comprise a last level cache (LLC), allowing for more than one level of cache to be associated with each processor core. In the flow 100, the hierarchical cache comprises a compute coherency block cache (CCB$) 124. The compute coherency block cache can be managed by the logic comprising the compute coherency block (CCB), which can include maintaining coherency between copies of data, for example cache lines within local storage such as the local caches, and the data in storage such as a shared memory system. The copies of the data and the contents of the shared memory system can become incoherent when one or more copies of the data or the contents of the shared memory system are cleared, updated, overwritten, or otherwise changed. As presented throughout, the managing coherency can include managing coherency among the one or more processor cores, the local cache associated with each processor core, a hierarchical cache, a common memory system or structure, the network-on-chip, and so on. In embodiments, the compute coherency block (CCB) comprises CCB logic and storage functionality and CCB cache (CCB$) functionality. In other embodiments, one or more processor cores and their associated local caches can be included in the CCB.

The flow 100 further comprises including a last-level cache (LLC) cache 126 as the CCB$. The LLC can be accessible by the CCB. The LLC can contain cache lines loaded from a memory structure such as a shared memory structure. The LLC can further contain cache lines to be stored in the shared memory structure. A cache field can be associated with the LLC. Embodiments comprise including a last-level cache (LLC) cache field in the cache line directory. The LLC cache field can include one or more bits. In embodiments, the LLC cache field can contain two bits. The two bits can be used to represent a state, a code, and so on associated with a cache line within the LLC. In embodiments, the LLC cache field bits can be defined as a '00'b indicating an invalid cache line, a '01'b indicating a shared cache line, a '10'b indicating an exclusive-clean cache line, and a '11'b indicating an exclusive-dirty cache line. Other numbers of bits and encodes can also be included to enable support of more than four cache coherency protocol states, such as the so-called MOESI cache coherency protocol, which includes five protocol states.

In embodiments, the coherency can be managed within the compute coherency block. The compute coherency block (CCB) can include a generator such as a snoop queue, a tag memory, a directory, a data memory, and so on (discussed below). The CCB can perform one or more cache coherency operations such as cache maintenance operations. The cache maintenance operations can maintain coherency among the processor cores, the common memory structure, the local caches, the network-on-chip, and other elements within a coherency domain. A subset of the cache maintenance operations can include cache block operations (CBOs). The cache block operations can accomplish a variety of data handling operations such as setting a state of all local caches into a particular state with respect to the common memory. The CBO operations can be applied to caches such as local caches within a coherency domain. The coherency domain can include the common memory, the local caches associated with groupings of processors, and so on. In order for the CBO operations to be performed within the coherency domain, the CBO operations can be mapped to standardized cache transactions. The standardized cache transactions can be associated with a processor type, an industry standard, and so on. In embodiments, standardized transactions can include cache maintenance operations supporting cache transactions such as ARM™ Advanced eXtensible Interface (AXI™) Coherence Extensions (ACE™) cache transactions, Advanced Microcontroller Bus Architecture (AMBA™) Coherence Hub Interface (CHI™) transactions, etc. The mappings of the CBOs can be different for transactions originating from cores or caches to cores globally, and to cores and caches locally in a compute coherency block cache. In embodiments, the cache coherency transactions can be issued globally before being issued locally. The issuing globally before issuing locally can accomplish saving new data to the common memory and sharing the new data to the other local caches. In embodiments, the cache coherency transactions that are issued globally can complete before cache coherency transactions are issued locally. In embodiments, the CCB can include a common ordering point for coherency management. The ordering point can be used to order memory access operations such as read operations.

The flow 100 includes providing a cache line directory 130 for the CCB. The CCB can contain one or more fields, where the fields can be used to determine instances of data such as cache lines, cache line status, and so on. In the flow 100, the cache line directory includes a core list field 132. The core list field can be used to indicate the presence of an object such as a cache line in a processor core. The core list field can include one or more bits. In embodiments, the core list field contains N bits, where N is the number of cores managed by the CCB. In a usage example, a plurality of processor cores that includes eight processor cores results in the core list field being eight bits wide. In the flow 100, the cache line directory includes a cache line present field 134. The cache line present field can indicate that a cache line is present within a type of cache. In embodiments, the cache line present field can contain M bits, where M is the number of cache types in each of the processor cores. A type of cache can include a local cache, a shared cache, a hierarchical cache, and the like. In embodiments, M is equal to two. The cache types can include one or more caches associated with a processor core. In embodiments, M is equal to two represents an instruction cache (I$) and a data cache (D$).

Recall that a cache line can be present in one or more locations. In a usage example, a cache line can be present in a shared structure such as a shared memory structure, one or more local caches associated with the one or more processor cores, the hierarchical cache, and so on. In embodiments, the cache line present field can indicate that a cache line present in the CCB hierarchical cache (CCB$) can also be present in at least one processor core cache. The presence of a cache line in one or more locations can indicate that cache maintenance operations may need to be performed in order to maintain coherency within the CCB$. The cache maintenance can be based on ownership of a cache line. The flow 100 further includes inferring cache line ownership 136, based on corresponding values of the core list field and the line present field. The values of the core list field in the cache line present field can be used to infer whether a cache line is a shared cache line or a unique cache line. In embodiments, a cache line can be inferred to be shared when more than one bit in the core list field is set. The more than one bit in the core list field being set can indicate that a cache line can be present in more than one local cache associated with the processor cores. In other embodiments, a cache line can be inferred to be shared when at least one bit in the core list field is set and an instruction cache (I$) bit in the cache line present field is set. The instruction present in the instruction cache associated with each processor can access a storage address. Since a substantially similar instruction can be executed by multiple processors, the same address can be accessed by each instantiation of the instruction. In embodiments, a cache line can be inferred to be shared when at least one bit in the core list field is set and an instruction cache (I$) bit and a data cache (D$) bit in the cache line present field are set. The substantially similar instructions just described can access copies such as local copies of the data, thus cache maintenance operations may be required to maintain coherency. In embodiments, a cache line can be inferred to be unique when only one bit in the core list field is set and only a data cache (D$) bit in the cache line present field is set. Such bit settings indicate that there is only one copy of the cache line.

The flow 100 further includes supporting snoop operations 138 within the CCB. Snoop operations can be generated to examine memory access operations to a location, a physical address, and so on. The snoop operations can be used to detect whether an operation executed by a second or other processor core may impact data required by a processor. The snoop operations can be generated based on a unique physical address at which an access operation such as a read operation is targeted. Ordering of snoop operations can be based on an order of execution of instructions executing on a processor core, a priority of operations, and so on. One or more responses can be generated based on the snoop operations. Each snoop response corresponds to a snoop request operation. The snoop responses can include an indication of content differences among local caches and the common memory structure. The differences, when identified, can be remedied using one or more cache maintenance operations. Once all outstanding snoop responses are collected by the snoop queue, it can then control transfer of cache lines or partial cache lines between the CCB$ and the common memory. Further embodiments can comprise including a snoop active field in the cache line directory. The snoop active field can include a number of bits. In embodiments, the snoop active field can contain one bit. The snoop active field can ensure that the directory detects outstanding snoop operations requiring serialization, regardless of the state of other bits in directory entry. The snoop active field can contain other numbers of bits, where the bits can indicate whether a single snoop operation is active, a plurality of snoop operations is active, etc. In embodiments, the snoop active field can indicate that the cache line is being snooped by the CCB.

In addition to the snoop requests corresponding to entries in cache such as a local cache or the hierarchical cache, data access snoops can be submitted to a data region of a common memory structure and instruction access snoops can be submitted to an instruction region of the common memory structure. In other embodiments, data access snoops can be associated with a processor core load/store unit and instruction access snoops can be associated with a processor core instruction fetch unit. In embodiments, the ordering and the mapping can include a common ordering point for coherency management. The ordering and the mapping can be used to identify what data in the common memory structure or within which cache has been changed since data was copied to one or more caches. In embodiments, the common ordering point can include a compute coherency block coupled to the plurality of processor cores. The compute coherency block can maintain coherency among the plurality of processor cores. In embodiments, the snoop responses can be based on completed snoop operations, if required. Other snoop operations can include pending snoop operations. The completion of pending snoop operations, if required, can be dependent on access times to the common memory structure, access times to one or more local caches, and so on. Completion of the pending snoop operations can further be based on interface or bus contention. The flow 100 further includes supporting external coherence operations 140 from outside the CCB within the CCB. External coherence operations can include operations such as cache maintenance operations that can originate from outside the CCB. The external coherence operations can be associated with maintaining coherence between the CCB$ and one or more caches external to the CCB.

The flow 100 includes detecting a cache line operation 150, wherein the cache line operation is detected by the CCB, and wherein the cache line operation is represented by an entry in the cache line directory. The cache line operation can include a cache maintenance operation. The cache maintenance operations can be used to maintain coherency within the CCB. The cache maintenance operations can include cache line operations. In embodiments, a cache maintenance operation can include cache block operations. The cache block operation can accomplish coherency among the local caches managed by the CCB and the hierarchical cache. The cache block operations can set, reset, clear, etc. the contents of cache lines, cache blocks, and so on. In embodiments, the cache block operations can include a cache line zeroing operation, a cache line cleaning operation, a cache line flushing operation, and a cache line invalidating operation. Other cache line operations can also be performed. In other embodiments, the cache line operation includes a coherent read operation. A coherent read operation can be based on whether the cache contents are clean, dirty, shared, and so on. In embodiments, the coherent read operation can include a ReadShared operation and a ReadUnique operation.

The flow 100 includes performing the cache line operation 160, based on corresponding values of the core list field and the line present field. The cache line operation can be used to maintain coherency between and among local copies of cache lines and cache blocks within local caches associated with processor cores and the CCB$ (last level cache), and/or between the LLC and the shared memory structure. Discussed previously, the cache line operations that are performed can include a cache maintenance operation. In embodiments, the performing the cache line operation can be further based on one or more values in the snoop active field. The snoop active field can indicate that a load operation is executing or pending, a store operation is executing or pending, that one or more of load and/or store operation are pending, etc. An instruction fetch can also cause a snoop operation. Embodiments can include postponing a pending operation, based on the snoop active field being set. Recall that the snoop active field being set can indicate that one or more snoop operations are in progress. The delaying a pending operation can be based on more than one operation accessing the same address. The delaying can be based on operation order, precedence, priority, etc.

The cache line operation can access a location within a local cache, the hierarchical cache, a common memory structure, and so on. In embodiments, the cache line operation can include a data load (read) from a cache. The cache line operation can further include a data store (write) to a cache. In other embodiments, the cache line operation comprises an instruction fetch from the cache. The instruction fetch can fetch one or more instructions in an instruction fetch operation. The comparison of the snoop operations and the snoop responses can be used to identify which of the one or more snoop operations corresponds to one or more snoop responses. Recall that a processor core can generate two or more memory access operations such as read operations. In embodiments, the comparing can select the earliest snoop operation corresponding to the header of a two-dimensional matrix. The earliest snoop operation can be associated with an earliest cache line operation. Selecting the earliest snoop operation can be used to maintain coherency between one or more local caches and a common memory structure. In embodiments, the completing a cache line operation is based on the earliest snoop operation that was selected. Completing based on the earliest snoop operation that was selected can maintain a correct order of execution of cache line operations based on code executing on a processor core.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
FIG. 2 is a flow diagram for cache line handling.
Figure 2:
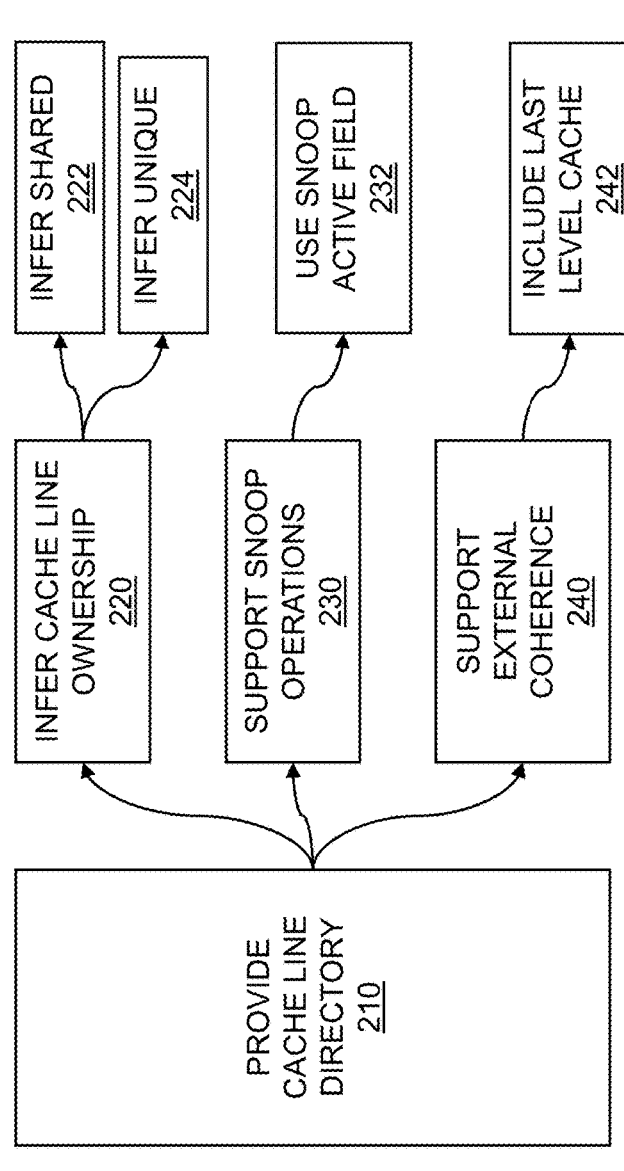

FIG. 2 is a flow diagram for cache line handling. A plurality of cache lines can be stored in one or more caches. The one or more caches can include a local cache associated with each processor core within a plurality of processor cores, shared caches, a hierarchical cache, a last level cache, and so on. The caches can enhance storage access operations by providing data to and receiving data from one or more processor cores. Since the caches are smaller and faster in comparison to storage such as a shared storage system, with caches, data can be loaded or stored, cache lines accessed, etc. faster than loading or storing data from and to the shared storage system. Further, the caches are positioned in proximity to processor cores, thereby reducing or eliminating access delays associated with one or more buses, buffers, and so on. However, coherency must be maintained between and among the contents of the one or more local caches, shared caches, the hierarchical cache, the shared memory system, etc. Coherency can be maintained by effective cache line handling. In embodiments, the cache line handling is enabled by coherent hierarchical cache line tracking. A plurality of processor cores is accessed, wherein each processor of the plurality of processor cores includes a local cache. A hierarchical cache is coupled to the plurality of processor cores, wherein the hierarchical cache is shared among the plurality of processor cores, wherein coherency between the plurality of processor cores and the hierarchical cache is managed by a compute coherency block (CCB). A cache line directory is provided for the CCB, wherein the cache line directory includes a core list field and a cache line present field. A cache line operation is detected, wherein the cache line operation is detected by the CCB, and wherein the cache line operation is represented by an entry in the cache line directory. The cache line operation is performed based on corresponding values of the core list field and the line present field.

The flow 200 includes providing 210 a cache line directory for the compute coherency block (CCB). Recall that the cache coherency can include one or more processor cores and a hierarchical cache. Further, a local cache can be coupled to each of the one or more processor cores. The local caches, hierarchical cache, shared memory system, and so on become incoherent when changes are made to the contents of an address in the shared memory system, local cache, etc. without the change being reflected in all copies of the contents of the address. Coherency is maintained within the CCB by performing one or more cache maintenance operations. In embodiments, a cache maintenance operation can include cache block operations. The cache block operation can accomplish coherency among the local caches and the hierarchical cache within the CCB. The cache block operations can manipulate the contents of cache lines, cache blocks, and so on. In embodiments, the cache block operations can include a cache line zeroing operation, a cache line cleaning operation, a cache line flushing operation, and a cache line invalidating operation. Other cache line operations can also be performed. In other embodiments, the cache line operation includes a coherent read operation. A coherent read operation can be based on whether the cache contents are clean, dirty, shared, and so on. In embodiments, the coherent read operation can include a ReadShared operation and a ReadUnique operation.

In embodiments, the cache line directory includes a core list field and a cache line present field. Discussed previously and throughout, the core list field can comprise N bits, where N can be the number of cores in the compute coherency block. The cache line present field can comprise M bits, where M is the number of cache types in each of the processor cores. Here, M can be equal to two, where two represents an instruction cache (I$) and a data cache (D$). The flow 200 can further include inferring cache line ownership 220, based on corresponding values of the core list field and the line present field. Determining cache line ownership can be critical to avoiding cache line access hazards. The cache line ownership can also be used to set access precedence, access priority, etc. Cache line ownership can be based on an origin of the cache line, a number of copies of the cache line, and so on. In the flow 200, a cache line can be inferred to be shared 222 when more than one bit in the core list field is set. Recall that a bit such as a set bit in the core list field can indicate that a given cache line is present in a local cache associated with a processor core. Thus, if more than one bit is set, then one can infer that the given cache line is present in more than one local cache.

Other inferences with regard to ownership can be made. In embodiments, a cache line can be inferred to be shared when at least one bit in the core list field is set and an instruction cache (I$) bit in the cache line present field is set. The set instruction cache bit can indicate that an instruction or operation in the instruction cache will operate on the cache line. In other embodiments, a cache line can be inferred to be shared when at least one bit in the core list field is set and an instruction cache (I$) bit and a data cache (D$) bit in the cache line present field are set. The set bits can indicate that a cache line is present in more than one local cache, that an instruction will, when executed, operate on the cache line, or that the data can be required by more than one operation. If the cache line is not present in more than one location, then the cache line can be considered unique. In embodiments, a cache line can be inferred to be unique 224 when only one bit in the core list field is set and only a data cache (D$) bit in the cache line present field is set.

The flow 200 further includes supporting snoop operations 230 within the CCB. A snoop operation can include examining pending access operations, such as access operations associated with cache lines within a local cache, shared cache, hierarchical cache, and so on to determine whether operations executed by multiple cores need to access the same address in a local, shared, hierarchical, or other cache or storage. The snooping can also include broadcasting that an address is being accessed for loading, storing, or both. The flow 200 can further comprise including a snoop active field 232 in the cache line directory. The snoop active field can be used to indicate that a snoop operation is being performed or not. In embodiments, the snoop active field can indicate that the cache line is being snooped by the CCB. The snooping the cache line can determine whether other operations require access to the same cache line. The snoop active field can comprise a number of bits. In embodiments, the snoop active field can include one bit. The snoop active field can be used to determine whether an operation can proceed. Embodiments can further include postponing a pending operation, based on the snoop active field being set.

In a usage example, a snoop active bit can be set for an operation that includes loading a cache line. A second operation that can include a store operation can also require access to the cache. Seeing the snoop active bit set can indicate that a store to the cache line can be postponed until the snoop active bit is cleared at the end of the cache line load operation. In embodiments, the performing the cache line operation can be further based on one or more values in the snoop active field.

Snoop operations can be used to monitor transactions such as bus transactions, where the bus transactions can be associated with memory access operations. The snoop operations can be generated by the compute coherency block, where the snoop requests correspond to entries in the memory queue. The memory access operations, which can include cache line access operations, can include read, write, read-modify-write operations, etc. The snoop requests can be used to maintain coherency between data in the common memory and copies of the data in any caches. The snoop requests can determine whether data in the common memory or any shared copies of the data have been modified. If a modification has occurred, then the change can be propagated to all copies of the data so that all other copies of the data reflect the changes to the data. The copies of the data can be stored in cache memory, local memory, shared common memory, and so on. Thus, the snoop operations can request information associated with changes to local cache data, other local cache data, common memory data, and the like. A snoop response can be received in response to a snoop operation. A snoop operation can monitor memory access operations to determine whether an access operation can modify shared data at an address. If the access operation can modify data, then the snoop operation can determine whether a local copy of the shared data is the same as the modified data or different from the modified data. If different, then a coherency management operation can be performed to ensure that all copies of the shared data are coherent (i.e., substantially similar).

The flow 200 further includes supporting external coherence operations 240 from outside the CCB within the CCB. Storage elements outside the CCB can be accessed when an address associated with a load operation or store operation does not match an address in a local cache, the hierarchical cache, and so on. This "cache miss" can result in the address being beyond the CCB in storage such as shared memory system, shared storage, etc. To reduce access times when a cache miss occurs, storage can be provided to the CCB that is closer than the shared memory system. The closer storage can be accessed more quickly than the shared memory system. Further embodiments comprise including a last-level cache (LLC) 242. The last level cache can include a cache that can be positioned or coupled between the compute coherency block and storage or memory such as a shared memory system. The LLC can include a single level cache, a multilevel cache, and so on. In embodiments, the LLC can include a level two (L2) cache. Cache line operations can include operations associated with the LLC. Further embodiments can comprise including a last-level cache (LLC) cache field in the cache line directory. As with other cache line directory fields, the LLC cache field can include one or more bits that can enable or disable access, provide a status of LLC cache contents, and so on. In embodiments, the LLC cache field can contain two bits. The two bits can be used to define a cache line state or status. In embodiments, the LLC cache field bits can be defined as a '00'b indicating an invalid cache line, a '01'b indicating a shared cache line, a '10'b indicating an exclusive-clean cache line, and a '11'b indicating an exclusive-dirty cache line. The LLC cache field bits can enable one or more cache line operations. In embodiments, the performing the cache line operation can be further based on values in the LLC cache field.

The memory queue can be used to control the transfer of data such as cache line data. In embodiments, the cache line data can include evict queue cache line data, miss queue cache line data, and so on. Snoop operations generated by a compute coherency block can result in one or more snoop responses. The snoop operations and the snoop responses can be used to enable coherency management among a plurality of processors, one or more local caches, a shared, common memory, etc. The snoop operations can be performed on read operations generated by one or more processor cores. The snoop responses can enable transferring of cache lines between the CCB and the common memory structure using an interconnect, a network such as a network-on-chip, a bus, and so on. Coherency between the caches and the common memory can be maintained using one or more cache coherency transactions. The coherency management is enabled by using memory queues. A plurality of processor cores is accessed, wherein the plurality of processor cores comprises a coherency domain, and wherein two or more processor cores within the plurality of processor cores generate read operations for a common memory structure coupled to the plurality of processor cores. Coherency is managed for the coherency domain using a compute coherency block (CCB), wherein the CCB includes a memory queue for managing or controlling the cache line transfers determined by the CCB. Snoop requests are generated, by the CCB, wherein the snoop requests correspond to entries in the memory queue. Cache lines are transferred between the CCB$ and a bus interface unit, based on a response to the snoop requests, wherein the bus interface unit controls memory accesses. The cache line transfer is controlled by the memory queue.

Cache maintenance operation can include cache block operations. A cache block can include a portion or block of common memory contents, where the block can be moved from the common memory into a local cache. In embodiments, the cache block operations can include a cache line zeroing operation, a cache line cleaning operation, a cache line flushing operation, and a cache line invalidating operation. These operations are discussed in detail below. The cache block operations can be used to maintain coherency. In embodiments, the cache line zeroing operation can include uniquely allocating a cache line at a given physical address with a zero value. The zero value can be used to overwrite and thereby clear previous data. The zero value can indicate a reset value. The cache line can be set to a nonzero value if appropriate. In embodiments, the cache line cleaning operation can include making all copies of a cache line at a given physical address consistent with that of memory. Recall that the processors can be arranged in groupings of two or more processors and that each grouping can be coupled to a local cache. One or more of the local caches can contain a copy of the cache line. The line cleaning operation can set or make all copies of the cache line consistent with the common memory contents. In other embodiments, the cache line flushing operation can include flushing any dirty data for a cache line at a given physical address to memory and then invalidating any and all copies. The "dirty" data can result from processing a local copy of data within a local cache. The data within the local cache can be written to the common memory to update the contents of the physical address in the common memory. In further embodiments, the cache line invalidating operation can include invalidating any and all copies of a cache line at a given physical address without flushing dirty data. Having flushed data from a local cache to update the data at a corresponding location or physical address in the common memory, all remaining copies of the old data within other local caches becomes invalid.

The cache line instructions just described can be mapped to standard operations or transactions for cache mainte-nance, where the standard transactions can be associated with a given processor type. In embodiments, the processor type can include a RISC-V™ processor core. The standard cache maintenance transactions can differ when transactions occur from the cores and when transactions occur to the cores. The transactions can comprise a subset of cache maintenance operations, transactions, and so on. The subset of operations can be referred to as cache block operations (CBOs). The cache block operations can be mapped to standard transactions associated with an ARM™ Advanced eXtensible Interface (AXI™) Coherence Extensions (ACE™) interface, an Advanced Microcontroller Bus Archi-tecture (AMBA™) Coherence Hub Interface (CHI™), etc. In embodiments, the cache coherency transactions can be issued globally before being issued locally. A globally issued transaction can include a transaction that enables cache coherency from a core to cores globally. The issuing cache coherency transactions globally can prevent invalid data from being processed by processor cores using local, out-dated copies of the data. The issuing cache coherency transactions locally can maintain coherency within compute coherence blocks (CCBs), each managing a grouping of processors. In embodiments, the cache coherency transac-tions that are issued globally can complete before cache coherency transactions are issued locally. A variety of indi-cators, such as a flag, a semaphore, a message, a code, and the like, can be used to signify completion. In embodiments, an indication of completeness can include a response from the coherent network-on-chip.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodi-ments of the flow 200, or portions thereof, can be included on a semiconductor chip and implemented in special pur-pose logic, programmable logic, and so on.

Figure 3:
FIG. 3 is a system block diagram showing cache line usage.

FIG. 3 is a system block diagram showing cache line usage. A storage such as cache storage can hold information. The information that is held can include instructions or operations, data, and so on. The cache storage can include a local cache associated with a core such as a processor core, a cache shared between or among processor cores, a cache accessible to a plurality of processor cores, and so on. Accessing instructions and data within the local cache can be substantially faster than accessing the instructions and the data within a shared memory such as a memory system. Access is faster because the cache is smaller than the memory system and is located in close proximity to at least one processor core. The close proximity of the cache can provide instructions and data without the additional access delays associated with a shared bus, a crossbar switch, buffers, slower access times of a large memory system, etc. However, coherency must be maintained between data in the local and other local caches, shared caches, the memory system, and so on. Coherency is enabled by coherent hier-archical cache line tracking. A plurality of processor cores is accessed, wherein each processor of the plurality of proces-sor cores includes a local cache. A hierarchical cache is coupled to the plurality of processor cores, wherein the hierarchical cache is shared among the plurality of processor cores, wherein coherency between the plurality of processor cores and the hierarchical cache is managed by a compute coherency block (CCB). A cache line directory is provided for the CCB, wherein the cache line directory includes a core list field and a cache line present field. A cache line operation is detected, wherein the cache line operation is detected by the CCB, and wherein the cache line operation is represented by an entry in the cache line directory. The cache line operation is performed, based on corresponding values of the core list field and the line present field.

The system block diagram 300 includes a plurality of processor cores such as processor cores core 0 310, core 1 320, core 2 330, and core 3 340. While four processor cores are shown, other numbers of cores can be included. The processor cores can include multicore processors such as a RISC-V™ processor. The processor cores can generate read operations, which can be indicated for a common memory structure coupled to the processor cores. The read operations can be generated by any number of other processor cores located within a coherency domain. Each processor core can include a local cache. The local caches can include cache $0 312 associated with core 0 310; cache $1 322 associated with core 1 320; cache $2 332 associated with core 2 330; and cache $3 342 associated with core 3 340. The local caches can hold one or more cache lines that can be operated on by the core associated with a local cache. The system block diagram 300 can include a hierarchical cache 350. The hierarchical cache can be shared among the processor cores within the plurality of processor cores. The hierarchical cache can include a single level cache or a multilevel cache. The hierarchical cache can comprise a level two (L2) cache, a level three (L3) cache, a unified cache, and so on. The hierarchical cache can comprise a last level cache (LLC) for a processor core grouping.

The system block diagram 300 can include a coherent cache structure 352. The coherent cache structure can have coherency maintained between the one or more local caches such as local caches 312, 322, 332, and 342 associated with the processor cores 310, 320, 330, and 340, and the hierar-chical cache 350. The coherent cache structure can be managed using a cache line directory 360 (described below), along with other compute coherency block logic and storage functionality.

In embodiments, the coherency block can include a snoop generator. Snoop operations can be used to detect storage access operations that can change data at a storage address of interest. Recall that two or more processor cores can access the common memory, one or more local caches, memory queues, and so on. Access by a memory core to an address associated with any of the storage elements can change the data at that address. The snoop operations can be used to determine whether an access operation to a storage address could cause a cache coherency problem, such as overwriting data waiting to be read, reading old or stale data, and so on. In embodiments, the snoop operations can be based on physical addresses for the common memory struc-ture. The physical addresses can include absolute, relative, offset, etc. addresses in the common memory structure.

The system block diagram 300 can include a cache line directory 360. The cache line directory can include one or more fields. The fields can be used to identify storage addresses stored in one or more caches or one or more queues, status of cache contents such as clean or dirty contents, and so on. The caches can include the local caches associated with processor cores, the hierarchical cache, and so on. The system block diagram 300 can include a directory 362. In embodiments, the cache line directory includes a core list field and a cache line present field. The core list field can indicate a number of cores managed by the CCB. In embodiments, the core list field contains N bits, where N is the number of cores managed by the CCB. In a usage example, N is equal to 4 to represent the four processor cores 0 through 3 discussed previously. In other embodiments, the cache line present field contains M bits, where M is the number of cache types in each of the processor cores. In embodiments, M is equal to two. The cache types can include a local cache, a shared cache, and so on. In embodiments, M is equal to two represents an instruction cache (I$) and a data cache (D$).

The block diagram 300 further includes a snoop active field 364 in the cache line directory. The snoop active field can be used to determine whether a snoop of operations to determine whether one or more operations is attempting to access a given address. The address can be in a local queue, a shared queue, the hierarchical queue, a last level queue (discussed below) a memory system, and so on. The snoop operation can determine whether load (read) and store (write) operations are associated with the same address. The snoop operations can be used to detect access hazards. The snoop active field can include one or more bits. In embodiments, the snoop active field can contain one bit. In a usage example, the snoop active field bit equals zero can indicate that a snoop is not active, while the snoop active field bit equals one can indicate an active snoop. In embodiments, the snoop active field can indicate that the cache line is being snooped by the CCB.

The block diagram 300 can include a tag random access memory (RAM) 366. The tag RAM can include an area of cache that can be used to identify which data from storage such as shared storage is stored in each cache line associated with the cache. The tag RAM contents can comprise storage addresses. The storage addresses can include relative addresses. When an operation such as an operation being executed on a processor generates a storage access address, the address is compared to the contents of the tag RAM. If the address is found within the tag RAM, a cache hit results and the contents of that address can be accessed for loading or storing in the cache. If the address is not found within the tag RAM, a cache miss results, and the contents of that address are accessed within shared storage such as a shared memory system. A cache miss results in slower access times. The block diagram 300 can include a data RAM 368. The data RAM stores the contents of an address. The data RAM can include an instruction cache (I$), a data cache (D$), and so on. The instruction cache (I$) and the data cache (D$) can include portions of a RAM, separate RAMS, etc.

The system block diagram 300 can include memory 370. The memory can be colocated with the processor cores, accessible to the processor cores using a bus or network, and so on. The memory can act as a higher-level cache with respect to the local caches, the hierarchical cache, etc.

The system block diagram can include a bus interface unit (BIU) (not shown). The BIU can provide and/or manage an interface between the hierarchical cache 350 and an interconnect to memory or other processor core groupings and/or CCBs. In embodiments, the interconnect can be a system bus or an interconnect network such as a network-on-chip (NoC). The NoC can provide connectivity to a common memory structure. The bus interface unit can include a cache line storage block. The storage block can include a storage element such as a memory, a cache memory, a multilevel cache memory, a queue, a register, a register stack, and so on. The storage block can include one or more storage areas, regions, partitions, etc. The storage block can include an evict storage area and a miss storage area. The evict storage area can store evicted cache lines, and the miss storage area can store missed cache lines. In embodiments, cache lines can be transferred between the CCB$ and the bus interface unit. The transferring can be controlled by a memory queue. The transferring can be based on at least one response to the snoops generated by the CCB. The response can comprise the collection of all required, pending snoop request responses, that is, all snoop requests that need to complete for a particular operation have indeed been completed. Note that not all operations require a response to the snoop request in order for it to be satisfied. The transferring can be based on CCB scheduling. Cache lines can be transferred based on a variety of system states, program states, data states, etc. The transferring can occur from the CCB to the bus interface unit when the cache line is an evicted cache line. Recall that a cache line can be evicted from the CCB in order to transfer the cache line to the shared memory. The cache line transfer can be based on a write or store operation to the system memory.

The system block diagram can include a shared, common memory structure (not shown). The common memory structure can include memory colocated with the processor cores, adjacent to the processor cores, and so on. The common memory structure can include a cache memory, a multilevel cache memory, a large, shared memory structure, etc. In embodiments, the bus interface unit can access the common memory structure through an interconnect. The common memory can communicate with the bus interface unit using a variety of protocols, where the protocols can include one or more industry standard protocols, proprietary protocols, etc. The interconnect can include a bus, a network, and so on. The interconnect can include an AXI™ interconnect. In embodiments, the network can include network-on-chip functionality. The AXI™ interconnect can be used to connect memory-mapped "master" or boss devices to one or more "slave" or worker devices. The AXI interconnect can provide connectivity between a processor such as processor cores 310, 320, 330, and 340, and one or more peripherals (not shown). The one or more peripherals can include storage devices, networking devices, and so on. The peripherals can enable communication using the AXI™ interconnect by supporting standards such as AMBA™ version 4, among other standards.

Figure 4:
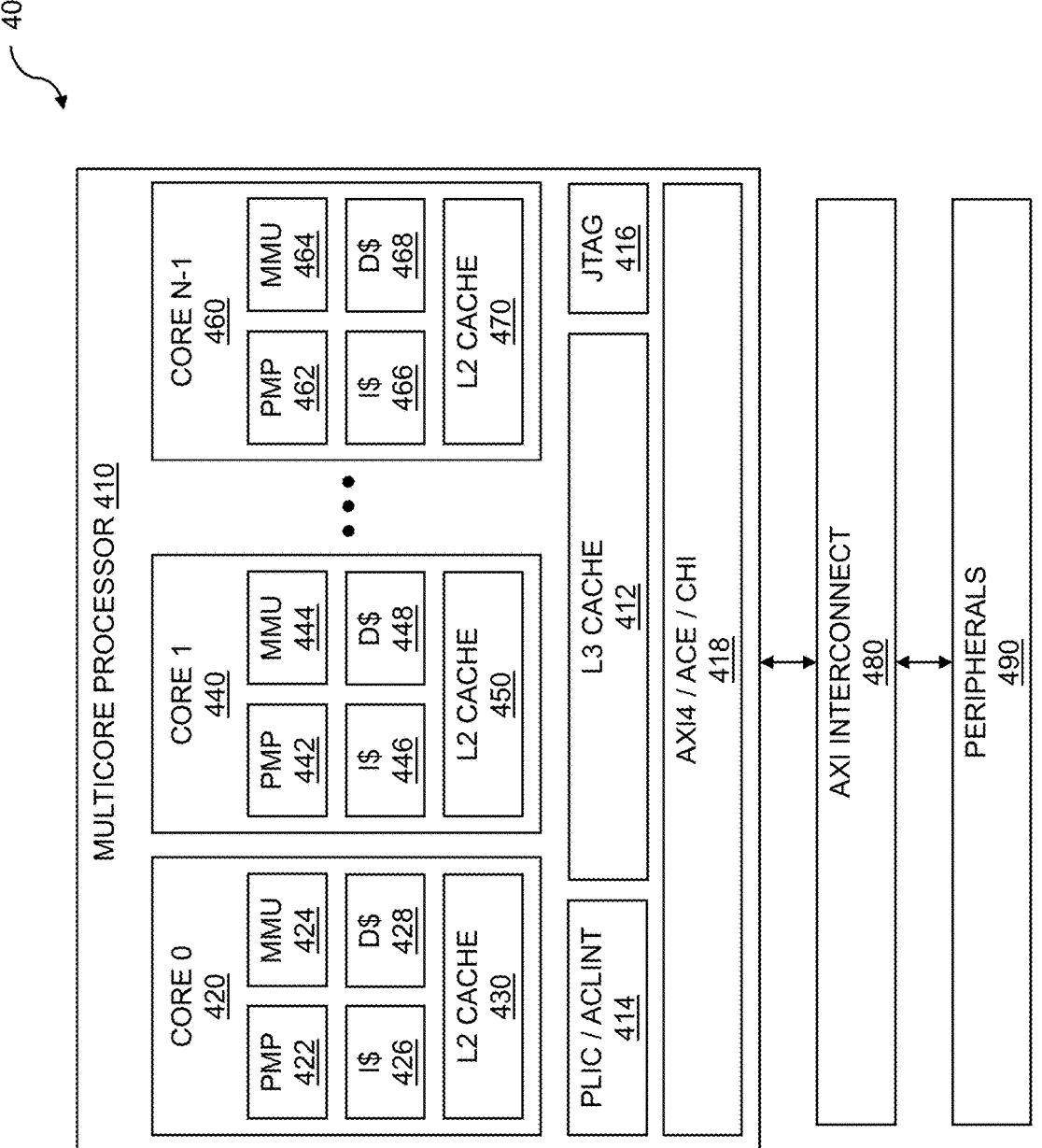
FIG. 4 is a block diagram illustrating a RISC-V™ processor.

FIG. 4 is a block diagram illustrating a RISC-V™ processor. The processor can comprise multiple processor cores, where two or more processor cores can be associated with the processor. The processor, such as a RISC-V™ processor, can include a variety of elements. The elements can include a plurality of processor cores, one or more caches, memory protection and management units, local storage, and so on. The elements of the multicore processor can further include one or more of a private cache, a test interface such as a Joint Test Action Group (JTAG) test interface, one or more interfaces to a network such as a network-on-chip (NoC), a coupling to a common memory structure, peripherals, and the like. The multicore processor is enabled by coherency management using coherent hierarchical cache line tracking. A plurality of processor cores is accessed, wherein each processor of the plurality of processor cores includes a local cache. A hierarchical cache is coupled to the plurality of processor cores, wherein the hierarchical cache is shared among the plurality of processor cores, wherein coherency between the plurality of processor cores and the hierarchical cache is managed by a compute coherency block (CCB). A cache line directory is provided for the CCB, wherein the cache line directory includes a core list field and a cache line present field. A cache line operation is detected, wherein the cache line operation is detected by the CCB, and wherein the cache line operation is represented by an entry in the cache line directory. The cache line operation is performed, based on corresponding values of the core list field and the line present field.

The block diagram 400 can include a multicore processor 410. The multicore processor can comprise two or more processors, where the two or more processors can include homogeneous processors, heterogeneous processors, etc. In the block diagram, the multicore processor can include N processor cores such as core 0 420, core 1 440, core N−1 460, and so on. Each processor can comprise one or more elements. In embodiments, each core, including cores 0 through core N−1, can include a physical memory protection (PMP) element, such as PMP 422 for core 0; PMP 442 for core 1, and PMP 462 for core N−1. In a processor architecture such as the RISC-V™ architecture, PMP can enable processor firmware to specify one or more regions of physical memory such as cache memory of the common memory, and to control permissions to access the regions of physical memory. The cores can include a memory management unit (MMU) such as MMU 424 for core 0, MMU 444 for core 1, and MMU 464 for core N−1. The memory management units can translate virtual addresses used by software running on the cores to physical memory addresses with caches, the common memory system, etc.

The processor cores associated with the multicore processor 410 can include caches such as instruction caches and data caches. The caches, which can comprise level 1 (L1) caches, can include an amount of storage such as 16 KB, 32 KB, and so on. The caches can include an instruction cache I$ 426 and a data cache D$ 428 associated with core 0; an instruction cache I$ 446 and a data cache D$ 448 associated with core 1; and an instruction cache I$ 466 and a data cache D$ 468 associated with core N−1. In addition to the level 1 instruction and data caches, each core can include a level 2 (L2) cache. The level 2 caches can include L2 cache 430 associated with core 0; L2 cache 450 associated with core 1; and L2 cache 470 associated with core N−1. Each core associated with multicore processor 410, such as core 0 420, and its associated cache(s), elements, and units can be "coherency managed" by a CCB. Each CCB can communicate with other CCBs that comprise the coherency domain. The cores associated with the multicore processor 410 can include further components or elements. The further elements can include a level 3 (L3) cache 412. The level 3 cache, which can be larger than the level 1 instruction and data caches, and the level 2 caches associated with each core, can be shared among all of the cores. The further elements can be shared among the cores. The further elements can be unique to a given CCB or can be shared among various CCBs. In embodiments, the further elements can include a platform level interrupt controller (PLIC) 414. The platform-level interrupt controller can support interrupt priorities, where the interrupt priorities can be assigned to each interrupt source. The PLIC source can be assigned a priority by writing a priority value to a memory-mapped priority register associated with the interrupt source. The PLIC can be associated with an advanced core local interrupter (ACLINT). The ACLINT can support memory-mapped devices that can provide inter-processor functionalities such as interrupt and timer functionalities. The inter-processor interrupt and timer functionalities can be provided for each processor. The further elements can include a joint test action group (JTAG) element 416. The JTAG can provide a boundary within the cores of the multicore processor. The JTAG can enable fault information to a high precision. The high-precision fault information can be critical to rapid fault detection and repair.

The multicore processor 410 can include one or more interface elements 418. The interface elements can support standard processor interfaces such as an Advanced eXtensible Interface (AXI™) such as AXI4™, an ARM™ Advanced eXtensible Interface (AXI™) Coherence Extensions (ACE™) interface, an Advanced Microcontroller Bus Architecture (AMBA™) Coherence Hub Interface (CHI™), etc. In the block diagram 400, the interface elements can be coupled to the interconnect. The interconnect can include a bus, a network, and so on. The interconnect can include an AXI™ interconnect 480. In embodiments, the network can include network-on-chip functionality. The AXI™ interconnect can be used to connect memory-mapped "master" or boss devices to one or more "slave" or worker devices. In the block diagram 400, the AXI interconnect can provide connectivity between the multicore processor 410 and one or more peripherals 490. The one or more peripherals can include storage devices, networking devices, and so on. The peripherals can enable communication using the AXI™ interconnect by supporting standards such as AMBA™ version 4, among other standards.

Figure 5:
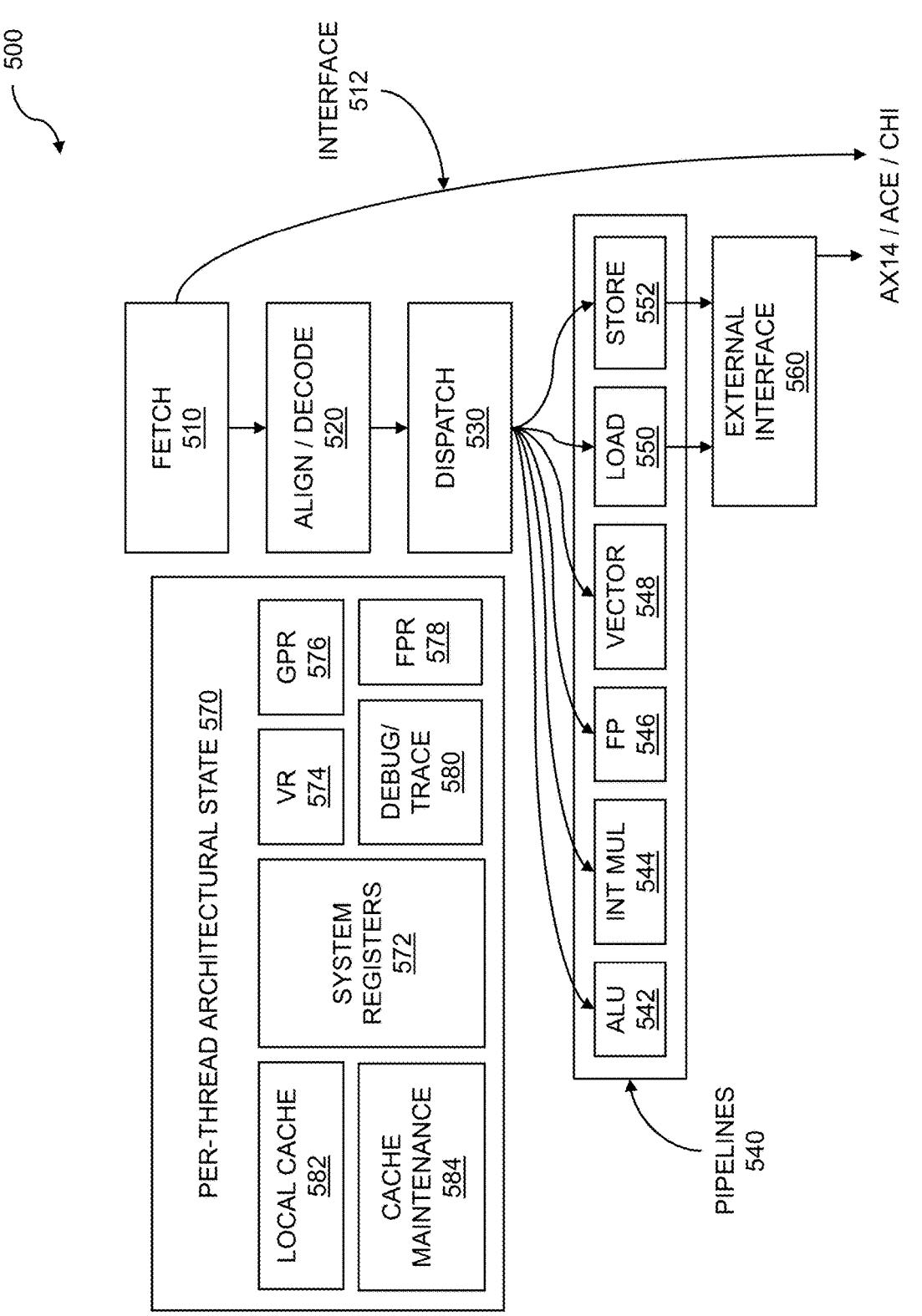
FIG. 5 is a block diagram for a pipeline.

FIG. 5 is a block diagram for a pipeline. The use of one or more pipelines associated with a processor architecture can greatly enhance processing throughput. The processor architecture can be associated with one or more processor cores, multiprocessors, and so on. The processing throughput can be increased because multiple operations can be executed in parallel. The use of one or more pipelines supports coherent hierarchical cache line tracking. A plurality of processor cores is accessed, wherein each processor of the plurality of processor cores includes a local cache. A hierarchical cache is coupled to the plurality of processor cores, wherein the hierarchical cache is shared among the plurality of processor cores, wherein coherency between the plurality of processor cores and the hierarchical cache is managed by a compute coherency block (CCB). A cache line directory is provided for the CCB, wherein the cache line directory includes a core list field and a cache line present field. A cache line operation is detected, wherein the cache line operation is detected by the CCB, and wherein the cache line operation is represented by an entry in the cache line directory. The cache line operation is performed, based on corresponding values of the core list field and the line present field.

The FIG. 500 shows a block diagram of a pipeline such as a processor core pipeline. The blocks within the block diagram can be configurable in order to provide varying processing levels. The varying processing levels can be based on processing speed, bit lengths, and so on. The block diagram 500 can include a fetch block 510. The fetch block can read a number of bytes from a cache such as an instruction cache (not shown). The number of bytes that are read can include 16 bytes, 32 bytes, 64 bytes, and so on. The fetch block can include branch prediction techniques, where the choice of branch prediction technique can enable various branch predictor configurations. The fetch block can access memory through an interface 512. The interface can include a standard interface such as one or more industry standard interfaces. The interfaces can include an Advanced eXtensible Interface (AXI™), an ARM™ Advanced eXtensible Interface (AXI™) Coherence Extensions (ACE™) interface, an Advanced Microcontroller Bus Architecture (AMBA™) Coherence Hub Interface (CHI™), etc.

The block diagram 500 includes an align and decode block 520. Operations such as data processing operations can be provided to the align and decode block by the fetch block. The align and decode block can partition a stream of operations provided by the fetch block. The stream of operations can include operations of differing bit lengths, such as 16 bits, 32 bits, and so on. The align and decode block can partition the fetch stream data into individual operations. The operations can be decoded by the align and decode block to generate decode packets. The decode packets can be used in the pipeline to manage execution of operations. The block diagram 500 can include a dispatch block 530. The dispatch block can receive decoded instruction packets from the align and decode block. The decoded instruction packets can be used to control a pipeline 540, where the pipeline can include an in-order pipeline, an out-of-order (OoO) pipeline, etc. For the case of an in-order pipeline, the dispatch block can maintain a register "scoreboard" and can forward instruction packets to various processors for execution. For the case of an out-of-order pipeline, the dispatch block can perform additional operations from the instruction set. Instructions can be issued by the dispatch block to one or more execution units. A pipeline can be associated with the one or more execution units. The pipelines associated with the execution units can include processor cores, arithmetic logic unit (ALU) pipelines 542, integer multiplier pipelines 544, floating-point unit (FPU) pipelines 546, vector unit (VU) pipelines 548, and so on. The dispatch unit can further dispatch instructions to pipelines that can include load pipelines 550 and store pipelines 552. The load pipelines and the store pipelines can access storage such as the common memory using an external interface 560. The external interface can be based on one or more interface standards such as the Advanced eXtensible Interface (AXI™). Following execution of the instructions, further instructions can update the register state. Other operations can be performed based on actions that can be associated with a particular architecture. The actions that can be performed can include executing instructions to update the system register state, to trigger one or more exceptions, and so on.

In embodiments, the plurality of processors can be configured to support multi-threading. The system block diagram can include a per-thread architectural state block 570. The inclusion of the per-thread architectural state can be based on a configuration or architecture that can support multi-threading. In embodiments, thread selection logic can be included in the fetch and dispatch blocks discussed above. Further, when an architecture supports an out-of-order (OoO) pipeline, then a retire component (not shown) can also include thread selection logic. The per-thread architectural state can include system registers 572. The system registers can be associated with individual processors, a system comprising multiple processors, and so on. The system registers can include exception and interrupt components, counters, etc. The per-thread architectural state can include further registers such as vector registers (VR) 574, general purpose registers (GPR) 576, and floating-point registers 578. These registers can be used for vector operations, general purpose (e.g., integer) operations, and floating-point operations, respectively. The per-thread architectural state can include a debug and trace block 580. The debug and trace block can enable debug and trace operations to support code development, troubleshooting, and so on. In embodiments, an external debugger can communicate with a processor through a debugging interface such as a joint test action group (JTAG) interface. The per-thread architectural state can include local cache state 582. The architectural state can include one or more states associated with a local cache such as a local cache coupled to a grouping of two or more processors. The local cache state can include clean or dirty, zeroed, flushed, invalid, and so on. The per-thread architectural state can include a cache maintenance state 584. The cache maintenance state can include maintenance needed, maintenance pending, and maintenance complete states, etc.

Figure 6:
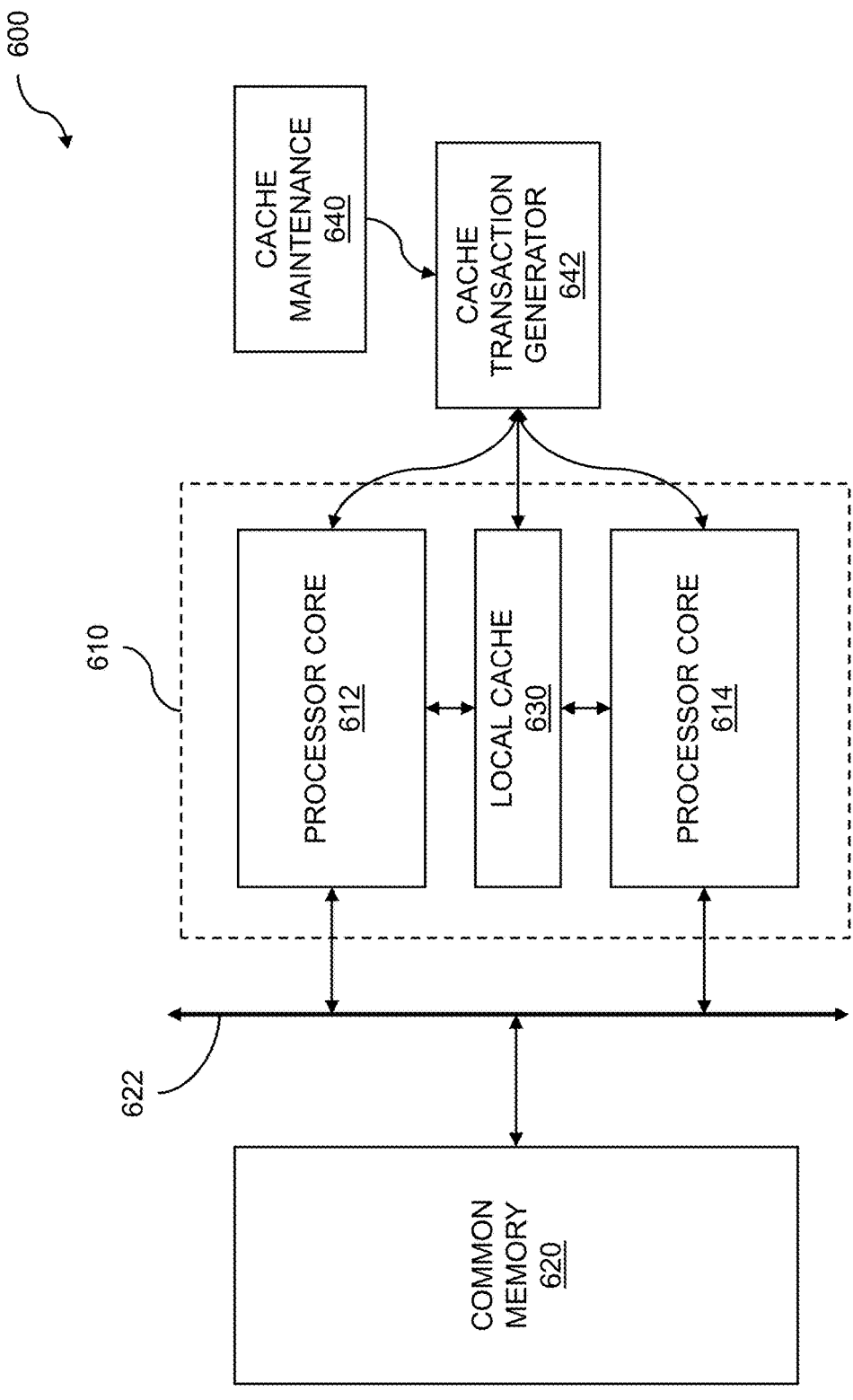
FIG. 6 is a system block diagram illustrating processor cores with cache management.

FIG. 6 is a system block diagram illustrating processor cores with cache management. In embodiments, each processor core can be coupled to a local cache. The processor cores and local caches can be arranged into groupings of two or more processor cores. In embodiments, a hierarchical cache can be coupled to the plurality of processor cores, where the plurality of processor cores and the hierarchical cache comprise a compute coherency block (CCB). The hierarchical cache and the local caches can be loaded with data from a source such as a common memory structure. The processor cores coupled to the hierarchical cache can process the data within the cache, causing the data to become "dirty" or different from the contents of the common memory. Since multiple groupings of processor cores can each be coupled to their own local caches, the problem of incoherency between the contents of the common memory structure, the hierarchical cache, and the local caches becomes highly complex. To resolve the coherency challenges, one or more coherency management operations can be applied to the data within the local caches, the hierarchical cache, and the common memory structure. An operation such as a snoop operation can examine common memory and cache access operations so that the access operations can be ordered and cache coherency problems can be avoided. The coherency management operations enable cache coherency management using coherent hierarchical cache line tracking. A plurality of processor cores is accessed, wherein each processor of the plurality of processor cores includes a local cache. A hierarchical cache is coupled to the plurality of processor cores, wherein the hierarchical cache is shared among the plurality of processor cores, wherein coherency between the plurality of processor cores and the hierarchical cache is managed by a compute coherency block (CCB). A cache line directory is provided for the CCB, wherein the cache line directory includes a core list field and a cache line present field. A cache line operation is detected, wherein the cache line operation is detected by the CCB, and wherein the cache line operation is represented by an entry in the cache line directory. The cache line operation is performed, based on corresponding values of the core list field and the line present field.

A system block diagram 600 of processor cores with cache management is shown. A multicore processor 610 can include a plurality of processor cores. The processor cores can include homogeneous processor cores, heterogeneous cores, and so on. In the system block diagram 600, two processor cores are shown, processor core 612 and processor core 614. The processor cores can be coupled to a common memory 620. The common memory can be shared by a plurality of multicore processors. The common memory can be coupled to the plurality of processor cores through a coherent network-on-chip 622. The network-on-chip can be colocated with the plurality of processor cores within an integrated circuit or chip, an application-specific integrated circuit (ASIC), a field programmable gate array (FPGA), and so on. The network-on-chip can be used to interconnect the plurality of processor cores and other elements within a system-on-chip (SoC) architecture. The network-on-chip can support coherency between the common memory 620 and one or more local caches (described below) using coherency transactions. In embodiments, the cache coherency transactions can enable coherency among the plurality of processor cores, one or more local caches, and the memory. The cache coherency can be accomplished based on coherency messages, cache misses, and the like.

The system block diagram 600 can include a local cache 630. The local cache can be coupled to a grouping of one or more processor cores within a plurality of processor cores. The local cache can include a multilevel cache. In embodiments, the local cache can be shared among the two or more processor cores. The cache can include a multiport cache. In embodiments, the grouping of two or more processor cores and the shared local cache can operate using local coherency. The local coherency can indicate to processors associated with a grouping of processors that the contents of the cache have been changed or made "dirty" by one or more processors within the grouping. In embodiments, the local coherency is distinct from the global coherency. That is, the coherency maintained for the local cache can be distinct from coherency between the local cache and the common memory, coherency between the local cache and one or more further local caches, etc.

The system block diagram 600 can include a cache maintenance element 640. The cache maintenance element can maintain local coherency of the local cache, coherency between the local cache and the common memory, coherency among local caches, and so on. The cache maintenance can be based on issuing cache transactions. In the system block diagram 600, the cache transaction can be provided by a cache transaction generator 642. In embodiments, the cache coherency transactions can enable coherency among the plurality of processor cores, one or more local caches, and the memory. The contents of the caches can become "dirty" by being changed. The cache contents changes can be accomplished by one or more processors processing data within the caches, by changes made to the contents of the common memory, and so on. In embodiments, the cache coherency transactions can be issued globally before being issued locally. Issuing the cache coherency transactions globally can ensure that the contents of the local caches are coherent with respect to the common memory. Issuing the cache coherency transactions locally can ensure coherency with respect to the plurality of processors within a given grouping. In embodiments, the cache coherency transactions that are issued globally can complete before cache coherency transactions are issued locally. The completion of the coherency transaction issued globally can include a response from the coherent network-on-chip.

Figure 7:
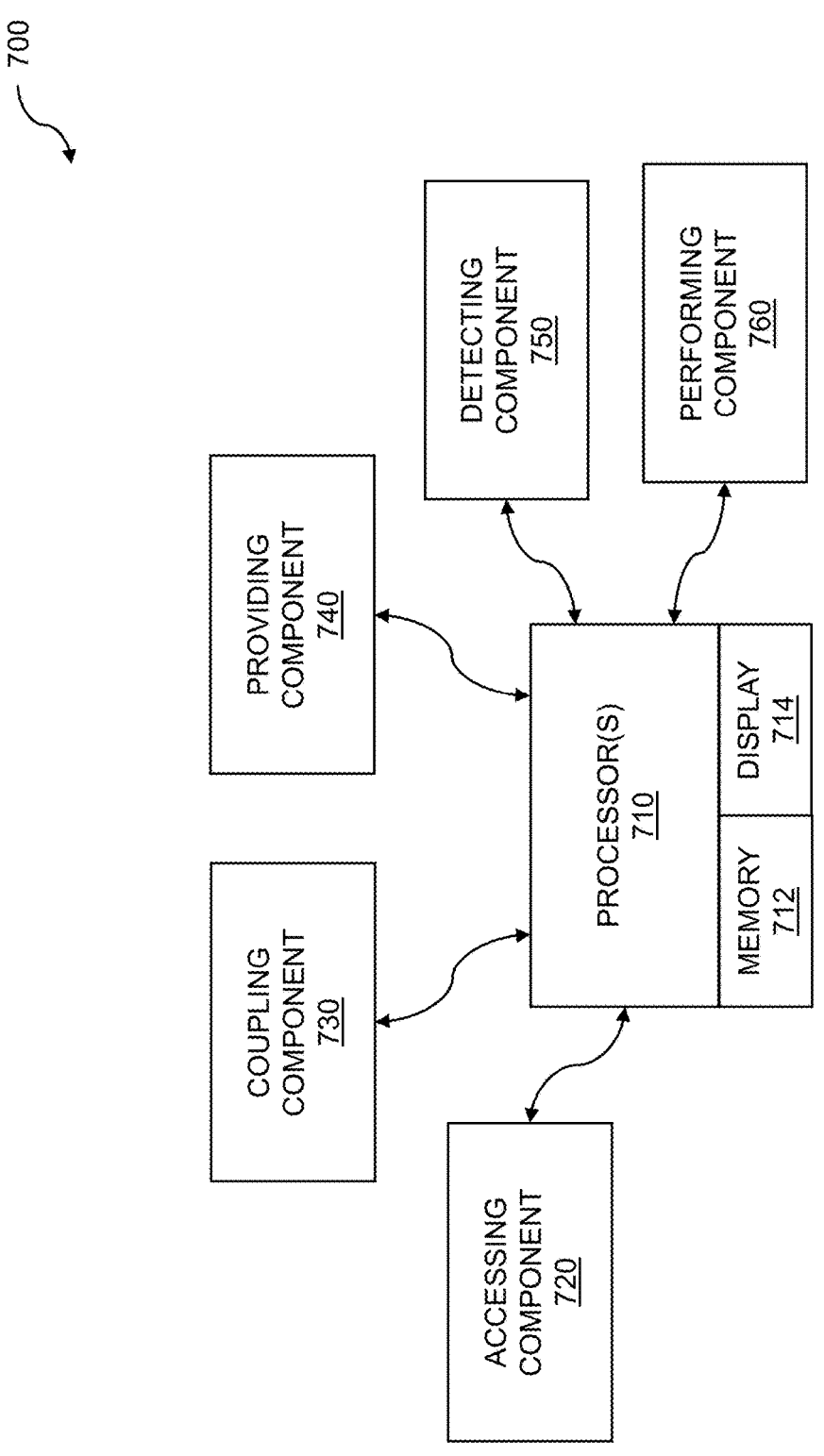
FIG. 7 is a system diagram for coherent hierarchical cache line tracking.

FIG. 7 is a system diagram for coherent hierarchical cache line tracking. The system can comprise a computer system for coherency management. The computer system can be based on semiconductor logic. The system can include one or more of processors, memories, cache memories, queues, displays, and so on. The system 700 can include one or more processors 710. The processors can include standalone processors within integrated circuits or chips, processor cores in FPGAs or ASICs, two or more processor cores within a multiprocessor, and so on. The one or more processors 710 are attached to a memory 712, which stores instructions, operations, etc. The memory can include one or more of local memory, cache memory, system memory, etc. The system 700 can further include a display 714 coupled to the one or more processors 710. The display 714 can be used for displaying data, instructions, operations, memory queue contents, snoop operations, snoop responses, and the like. The operations can include cache maintenance operations. The operations can further include cache maintenance operations, Advanced eXtensible Interface (AXI™) Coherence Extensions (ACE™) cache transactions, Advanced Microcontroller Bus Architecture (AMBA™) Coherence Hub Interface (CHI™) transactions, etc.

In embodiments, one or more processors 710 are coupled to the memory 712, wherein the one or more processors, when executing the instructions which are stored, are configured to: access a plurality of processor cores, wherein each processor of the plurality of processor cores includes a local cache; couple a hierarchical cache to the plurality of processor cores, wherein the hierarchical cache is shared among the plurality of processor cores, wherein coherency between the plurality of processor cores and the hierarchical cache is managed by a compute coherency block (CCB); provide a cache line directory for the CCB, wherein the cache line directory includes a core list field and a cache line present field; detect a cache line operation, wherein the cache line operation is detected by the CCB, and wherein the cache line operation is represented by an entry in the cache line directory; and perform the cache line operation, based on corresponding values of the core list field and the line present field.

The system 700 can include an accessing component 720. The accessing component 720 can access a plurality of processor cores. The processor cores can be accessed within one or more chips, FPGAs, ASICs, etc. In embodiments, the processor cores can include RISC-V™ processor cores. Each processor of the plurality of processor cores can include a local cache. The local cache that can be coupled to each processor can be colocated with its associated processor core, accessible by the processor core, and so on. In embodiments, the plurality of processor cores and coupled local caches can include a coherency domain. The coherency can include coherency between the common memory and cache memory, such as level 1 (L1) cache memory. L1 cache memory can include local cache coupled to groupings of two or more processor cores. The coherency between the common memory and one or more local cache memories can be accomplished using cache maintenance operations (CMOs), described previously. In embodiments, two or more processor cores within the plurality of processor cores can generate read operations for a common memory structure coupled to the plurality of processor cores. The read operations for the common memory can occur based on cache misses to local cache, thereby requiring the read operations to be generated for the common memory. In embodiments, each processor of the plurality of processor cores can access a common memory structure. The access to the common memory structure can be accomplished through a coherent network-on-chip. The common memory can include on-chip memory, off-chip memory, etc. The coherent network-on-chip comprises a global coherency.

The system 700 can include a coupling component 730. The coupling component 730 can couple a hierarchical cache to the plurality of processor cores, wherein the hierarchical cache is shared among the plurality of processor cores. The hierarchical cache can include a single level cache, a multi-level cache, and so on. The plurality of processor cores and the hierarchical cache comprise a compute coherency block (CCB). In embodiments, the CCB can include a memory queue. The memory queue can be used for controlling cache line transfers determined by the CCB. The CCB coherency can be enabled using one or more cache management operations. Further embodiments can include supporting snoop operations within the CCB. A snoop operation can include an operation to determine whether processors are attempting to access data at an address, where the data at the address can be present in more than one storage element. The storage elements can include one or more of local caches, the hierarchical cache, a shared memory system, a scratchpad, and so on. Further embodiments include a snoop active field in the cache line directory. The snoop bit can be used to indicate whether a cache line is being snooped. The checking whether a cache line is being snooped can occur at a time when a pipeline operation reads the cache line directory (discussed below).

The system 700 can include a providing component 740. The providing component 740 can provide a cache line directory for the CCB. The cache line directory can contain one or more cache lines and various fields associated with the contents of the cache line directory. The cache line directory can include a core list field and a cache line present field. The core list field and the cache line present field can be used to determine a presence and an ownership of a cache line including multiple, inclusive caches. The cache line directory can include additional bits. Embodiments further include a snoop active field in the cache line directory. The snoop active field can be used to indicate that the cache line is being snooped or not at a time that a pipeline operation performs a read of the cache line directory. In embodiments, the snoop active field can contain one bit. The snoop active field can indicate that a snoop is being performed by one or more cores. One or more snoops can be prioritized. In embodiments, the snoop active field indicates that the cache line is being snooped by the CCB.

The core list field and the cache line present field can each comprise bits. In embodiments, the core list field can contain N bits, where N can be the number of cores in the CCB. The cores that are associated with bits in the core list field each include a local cache. A set bit within the core list field can indicate that a cache line can be present in at least the marked core. In embodiments, the cache line present field can indicate that a cache line that is present in the CCB hierarchical cache can also be present in at least one processor core cache. The presence of the cache line within the CCB hierarchical cache and at least one processor core cache can indicate that cache maintenance operations may be necessitated. In embodiments, the cache line present field can contain M bits, where M can be the number of cache types in each of the processor cores. The cache types can include local cache, dedicated cache, shared cache, etc., where the caches can hold data, operations, and the like. In embodiments, M can be equal to two. M can be equal to other values if other numbers of cache types are included. In embodiments, M is equal to two can represent an instruction cache (I$) and a data cache (D$).

The system 700 can include a detecting component 750. The detecting component 750 can detect a cache line operation, wherein the cache line operation is detected by the CCB, and wherein the cache line operation is represented by an entry in the cache line directory. A cache line operation can load a cache line from memory, store a cache line to memory, and so on. In embodiments, a cache line operation can include mapping or assigning a cache line to a memory line; inserting a memory line into a cache line; updating a cache line; invalidating a cache line; flushing a cache line; cleaning a cache line; etc. The cache operations can include cache coherence and maintenance operations. Cache management operations can be used to determine one or more incoherencies among processors, caches, the common memory structure, and so on. The detecting component can detect one or more snoop operations. A snoop operation can "snoop" memory access transactions to determine whether processors have generated access requests to a physical address within the common memory.

The system 700 can include a performing component 760. The performing component 760 can perform the cache line operation, based on corresponding values of the core list field and the line present field. The cache line operation can include mapping, inserting, updating, invalidating, flushing, cleaning, etc. The cache line operation can include a cache line maintenance operation. In order to perform a cache line operation, ownership of a cache line can be inferred. Embodiments can include inferring cache line ownership, based on corresponding values of the core list field and the line present field. The cache line ownership can be used to determine an eligibility of a cache line for an operation, a validity or coherency of the cache line, etc. In embodiments, a cache line can be inferred to be shared when more than one bit in the core list field is set. Recall that a bit set core list field can indicate that the cache line associated with the cache line operation can be present in local cache of each core for which a bit is set in the core list field. In other embodiments, a cache line can be inferred to be shared when at least one bit in the core list field is set and an instruction cache (I$) bit in the cache line present field is set. The cache line can include a shared instruction that can be executed by more than one core. In other embodiments, a cache line can be inferred to be shared when at least one bit in the core list field is set and an instruction cache (I$) bit and a data cache (D$) bit in the cache line present field are set. The cache line can include a shared instruction that can access the shared data. Thus, the data must be valid in order for the instruction to execute and to produce valid data. In further embodiments, a cache line can be inferred to be unique when only one bit in the core list field is set and only a data cache (D$) bit in the cache line present field is set. That is, contents in a data cache are only present within that one data cache.

Recall that a snoop operation can be used to determine whether more than one operation needs to access a given address. The address can be present in a local cache associated with each of one or more cores, in a memory system, and so on. Since some operations such as a cache line operation can read contents of a cache line, modify a cache line, clear a cache line, etc., the order of the operations is critical to ensure correct processing of the cache line. A snoop operation can determine whether an address such as a load or a store address is present in one or more local caches, the hierarchical cache, etc. The snoop operation can be used to determine a proper order of execution of operations. Embodiments can include postponing a pending operation, based on the snoop active field being set. A snoop active field being set can indicate that another snoop operation is being performed. Executing a pending operation could change data required by the operation that initiated the snoop operation. In other embodiments, the performing the cache line operation can be further based on one or more values in the snoop active field. The one or more values in the snoop active field can indicate a snoop precedence, a snoop priority, a snoop order, etc.

In addition to maintaining coherency with the CCB, coherency can be maintained between cores, cores and the hierarchical cache, a memory system, and so on. Embodiments can include supporting external coherence operations from outside the CCB within the CCB. The external coherence operations can be associated with a cache, scratchpad memory, the memory system, etc. In embodiments, the system 700 can include a last level cache (LLC). The last level cache can hold data such as one or more cache lines. The cache lines can include modified cache lines that will update addresses in the memory system, addresses in other local caches, etc. The LLC can hold cache lines that update addresses in the hierarchical cache, local caches, and so on. In embodiments, the LLC can include a level two (L2) cache. The LLC can serve as an L2 cache to the hierarchal cache. The LLC can include a single level cache, a multi-level cache, and the like. Further embodiments can comprise including a last-level cache (LLC) cache field in the cache line directory. The LLC cache field can be used to determine the state of a cache line in the LLC. The cache field can represent a state of a cache line in an encoded form. In embodiments, the LLC cache field bits can be defined as a '00'b indicating an invalid cache line, a '01'b indicating a shared cache line, a '10'b indicating an exclusive-clean cache line, and a '11'b indicating an exclusive-dirty cache line. The LLC cache field bits can be used to control performing an operation such as a cache line operation. In embodiments, the performing the cache line operation can be further based on values in the LLC cache field.

In embodiments, the cache line operation can include a cache maintenance operation. A cache maintenance operation can be performed to maintain cache coherency. The cache coherency maintenance can be applied to a local cache coupled to a core, a shared cache coupled to two or more processor cores, one or more local caches, the hierarchical cache, the last level cache, a common memory, a memory system, and so on. Various cache maintenance operations (CMOs) can be performed. In embodiments, the cache maintenance operation can include cache block operations. The cache block operations can include a subset of maintenance operations. The cache block operations can update a state associated with all caches such as the local caches. The updated state can include a specific state with respect to the hierarchical cache, the last level cache, the common memory, etc. In embodiments, the cache block operations can include a cache line zeroing operation, a cache line cleaning operation, a cache line flushing operation, and a cache line invalidating operation. The cache line operations can include making all copies of a cache line consistent with a cache line from the common memory while leaving the consistent copies in the local caches; flushing "dirty" data for a cache line then invalidating copies of the flushed, dirty data; invalidating copies of a cache line without flushing dirty data to the common memory, and so on. In other embodiments, the cache line operation can include a coherent read operation. A coherent read operation can enable a read of data to be written to a memory address in a single cycle. The new data can be read (e.g., a "flow through") during an operation such as a read-during-write operation. In other embodiments, the coherent read operation can include a ReadShared operation and a ReadUnique operation.

The cache maintenance operation generates cache coherency transactions between global coherency and compute coherency blocks. The global coherency can include coherency between the common memory and local caches, among local caches, and so on. The local coherency can include coherency between a local cache and local processors coupled to the local cache. Maintaining the local cache coherency and the global coherency is complicated by the use of a plurality of local caches. Recall that a local cache can be coupled to a grouping of two or more processors. While the plurality of local caches can enhance operation processing by the groupings of processors, there can exist more than one dirty copy of one or more cache lines present in any given local cache. Thus, the maintaining of the coherency of the contents of the caches and the system memory can be carefully orchestrated to ensure that valid data is not overwritten, stale data is not used, etc. The cache maintenance operations can be enabled by an interconnect. In embodiments, the grouping of two or more processor cores and the shared local cache can be interconnected to the grouping of two or more additional processor cores and the shared additional local cache using the coherent network-on-chip. In embodiments, the system 700 performs cache management through implementation of semiconductor logic. One or more processors can execute instructions which are stored to generate semiconductor logic to: access a plurality of processor cores, wherein each processor of the plurality of processor cores accesses a common memory through a coherent network-on-chip, and wherein the coherent network-on-chip comprises a global coherency; couple a local cache to a grouping of two or more processor cores of the plurality of processor cores, wherein the local cache is shared among the two or more processor cores, wherein the grouping of two or more processor cores and the shared local cache operates using local coherency, and wherein the local coherency is distinct from the global coherency; and perform a cache maintenance operation in the grouping of two or more processor cores and the shared local cache, wherein the cache maintenance operation generates cache coherency transactions between the global coherency and the local coherency.

The transferring between the CCB$ and the bus interface unit can compensate for mismatches in bit widths, transfer rates, access times, etc. between the CCB$ and the bus interface unit. In embodiments, cache lines can be stored in a bus interface unit cache prior to commitment to the common memory structure. Once transferred to the BIU, the BIU can handle the transferring of cache lines such as evicted cache lines to the common memory based on the snoop responses. The transferring can include transferring the cache line incrementally or as a whole. The snoop responses can be used to determine an order in which the cache lines can be committed to the common memory. In other embodiments, cache lines can be stored in a bus interface unit cache pending a cache line fill from the common memory structure. The cache lines can be fetched incrementally or as a whole from the common memory and stored in the BIU cache. In other embodiments the ordering and the mapping can include a common ordering point for coherency management. The common ordering point can enable coherency management between a local cache and processor cores coupled to the local cache, between local caches, between local caches and the common memory, and the like. In further embodiments, the common ordering point can include a compute coherency block coupled to the plurality of processor cores. The compute coherency block can be colocated with the processor cores within an integrated circuit, located within one or more further integrated circuits, etc.

The system 700 can include a computer program product embodied in a non-transitory computer readable medium for coherency management, the computer program product comprising code which causes one or more processors to perform operations of: accessing a plurality of processor cores, wherein each processor of the plurality of processor cores includes a local cache; coupling a hierarchical cache to the plurality of processor cores, wherein the hierarchical cache is shared among the plurality of processor cores, wherein coherency between the plurality of processor cores and the hierarchical cache is managed by a compute coherency block (CCB); providing a cache line directory for the CCB, wherein the cache line directory includes a core list field and a cache line present field; detecting a cache line operation, wherein the cache line operation is detected by the CCB, and wherein the cache line operation is represented by an entry in the cache line directory; and performing the cache line operation, based on corresponding values of the core list field and the line present field.

The system 700 can include a computer program product embodied in a non-transitory computer readable medium for coherency management, the computer program product comprising code which causes one or more processors to generate semiconductor logic for: accessing a plurality of processor cores, wherein each processor of the plurality of processor cores includes a local cache; coupling a hierarchical cache to the plurality of processor cores, wherein the hierarchical cache is shared among the plurality of processor cores, wherein coherency between the plurality of processor cores and the hierarchical cache is managed by a compute coherency block (CCB); providing a cache line directory for the CCB, wherein the cache line directory includes a core list field and a cache line present field; detecting a cache line operation, wherein the cache line operation is detected by the CCB, and wherein the cache line operation is represented by an entry in the cache line directory; and performing the cache line operation, based on corresponding values of the core list field and the line present field.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions generally referred to herein as a "circuit," "module," or "system" may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium, or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for coherency management comprising:

accessing a plurality of processor cores, wherein each processor of the plurality of processor cores includes a local cache;

coupling a hierarchical cache to the plurality of processor cores, wherein the hierarchical cache is shared among the plurality of processor cores, wherein coherency between the plurality of processor cores and the hierarchical cache is managed by a compute coherency block (CCB);

providing a cache line directory for the CCB, wherein the cache line directory includes a core list field and a cache line present field, wherein the cache line present field contains M bits, where M is the number of cache types in each of the processor cores;

detecting a cache line operation, wherein the cache line operation is detected by the CCB, and wherein the cache line operation is represented by an entry in the cache line directory; and performing the cache line operation, based on corresponding values of the core list field and the line present field.

2. The method of claim 1 wherein the core list field contains N bits, where N is the number of cores managed by the CCB.

3. The method of claim 1 wherein M is equal to two.

4. The method of claim 3 wherein M is equal to two represents an instruction cache (I$) and a data cache (D$).

5. The method of claim 1 wherein the cache line present field indicates that a cache line present in the hierarchical cache is also present in at least one processor core cache.

6. The method of claim 1 further comprising inferring cache line ownership, based on corresponding values of the core list field and the line present field.

7. The method of claim 6 wherein a cache line is inferred to be shared when more than one bit in the core list field is set.

8. The method of claim 6 wherein a cache line is inferred to be shared when at least one bit in the core list field is set and an instruction cache (I$) bit in the cache line present field is set.

9. The method of claim 6 wherein a cache line is inferred to be shared when at least one bit in the core list field is set and an instruction cache (I$) bit and a data cache (D$) bit in the cache line present field are set.

10. The method of claim 6 wherein a cache line is inferred to be unique when only one bit in the core list field is set and only a data cache (D$) bit in the cache line present field is set.

11. The method of claim 1 further comprising supporting snoop operations within the CCB.

12. The method of claim 11 further comprising including a snoop active field in the cache line directory.

13. The method of claim 12 wherein the snoop active field contains one bit.

14. The method of claim 12 wherein the snoop active field indicates that the cache line is being snooped by the CCB.

15. The method of claim 12 further comprising postponing a pending operation, based on the snoop active field being set.

16. The method of claim 12 wherein the performing the cache line operation is further based on one or more values in the snoop active field.

17. The method of claim 1 further comprising supporting external coherence operations from outside the CCB within the CCB.

18. The method of claim 17 further comprising including a last-level cache (LLC) cache field in the cache line directory.

19. The method of claim 18 wherein the LLC cache field contains two bits.

20. The method of claim 19 wherein the LLC cache field bits are defined as a '00'b indicating an invalid cache line, a '01'b indicating a shared cache line, a '10'b indicating an exclusive-clean cache line, and a '11'b indicating an exclusive-dirty cache line.

21. The method of claim 18 wherein the performing the cache line operation is further based on values in the LLC cache field.

22. The method of claim 1 wherein the cache line operation includes a cache maintenance operation.

23. The method of claim 1 wherein the cache line operation includes a coherent read operation.

24. A computer system for coherency management comprising:

a memory which stores instructions;

one or more processors coupled to the memory wherein the one or more processors, when executing the instructions which are stored, are configured to:

access a plurality of processor cores, wherein each processor of the plurality of processor cores includes a local cache;

couple a hierarchical cache to the plurality of processor cores, wherein the hierarchical cache is shared among the plurality of processor cores, wherein coherency between the plurality of processor cores and the hierarchical cache is managed by a compute coherency block (CCB);

provide a cache line directory for the CCB, wherein the cache line directory includes a core list field and a cache line present field, wherein the cache line present field contains M bits, where M is the number of cache types in each of the processor cores;

detect a cache line operation, wherein the cache line operation is detected by the CCB, and wherein the cache line operation is represented by an entry in the cache line directory; and perform the cache line operation, based on corresponding values of the core list field and the line present field.

25. A computer program product embodied in a non-transitory computer readable medium for coherency management, the computer program product comprising code which causes one or more processors to generate semiconductor logic for:

accessing a plurality of processor cores, wherein each processor of the plurality of processor cores includes a local cache;

coupling a hierarchical cache to the plurality of processor cores, wherein the hierarchical cache is shared among the plurality of processor cores, wherein coherency between the plurality of processor cores and the hierarchical cache is managed by a compute coherency block (CCB);

providing a cache line directory for the CCB, wherein the cache line directory includes a core list field and a cache line present field, wherein the cache line present field contains M bits, where M is the number of cache types in each of the processor cores;

detecting a cache line operation, wherein the cache line operation is detected by the CCB, and wherein the cache line operation is represented by an entry in the cache line directory; and performing the cache line operation, based on corresponding values of the core list field and the line present field.

* * * * *